United States Patent
Behringer et al.

(10) Patent No.: US 10,813,437 B2
(45) Date of Patent: Oct. 27, 2020

(54) CARRYING DEVICE FOR CARRYING A HAND-GUIDED POWER TOOL TO BE CARRIED BY A USER

(71) Applicant: Andreas Stihl AG & Co. KG, Waiblingen (DE)

(72) Inventors: Patrick Behringer, Ostfildern (DE); Markus Pfeifer, Winnenden (DE); Timo Förg, Backnang (DE); Bastian Lepschy, Murrhardt (DE); Simon Haug, Waiblingen (DE); Martin Nitze, Remseck (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 25 days.

(21) Appl. No.: 16/132,364

(22) Filed: Sep. 15, 2018

(65) Prior Publication Data
US 2019/0082814 A1 Mar. 21, 2019

(30) Foreign Application Priority Data
Sep. 15, 2017 (DE) .......................... 10 2017 008 754

(51) Int. Cl.
*A45F 3/14* (2006.01)
*A01D 34/90* (2006.01)
*A01G 3/06* (2006.01)

(52) U.S. Cl.
CPC .............. *A45F 3/14* (2013.01); *A01D 34/902* (2013.01); *A01G 3/06* (2013.01); *A45F 2003/146* (2013.01); *A45F 2200/0575* (2013.01)

(58) Field of Classification Search
CPC .................. A45F 3/15; A45F 2003/146; A45F 2003/144; A45F 2200/0575; A45F 5/21;
(Continued)

(56) References Cited

U.S. PATENT DOCUMENTS 4,776,504 A * 10/1988 Panth .................... A45F 5/00
224/197
5,178,309 A * 1/1993 Bicheler .............. A47D 13/025
224/153
(Continued)

FOREIGN PATENT DOCUMENTS

DE 10 2007 048 104 4/2009
EP 2 243 347 10/2010
(Continued)

*Primary Examiner* — Brian D Nash
(74) *Attorney, Agent, or Firm* — Gudrun E. Huckett

(57) ABSTRACT

A carrying device for carrying a hand-guided power tool by a user has a shoulder strap and a lateral leg plate with a connecting unit for coupling a power tool to the carrying device. A support strap is connected with one end to the shoulder strap and the leg plate is slidably arranged at the support strap to slide along the support strap in a longitudinal direction thereof. A fixation device is arranged between support strap and leg plate and has a release position and a blocking position. In the release position, the leg plate is slidable along the support strap; in the blocking position, the leg plate is non-slidably secured on the support strap. The blocking position is correlated with a first working mode of the power tool; the release position is correlated with a second working mode of the power tool.

19 Claims, 27 Drawing Sheets

(58) Field of Classification Search
CPC .... A62B 35/0018; A62B 35/0025; B65G 7/12
See application file for complete search history.

(56) References Cited

U.S. PATENT DOCUMENTS

| | | | | |
|---|---|---|---|---|
| 5,620,121 A * | 4/1997 | Watson | ............... | A01D 34/902 172/370 |
| 5,624,065 A * | 4/1997 | Steffe | ................. | A41D 13/01 2/312 |
| 5,662,339 A * | 9/1997 | Svendsen | ............ | A47D 13/025 224/153 |
| 5,704,530 A * | 1/1998 | Scherer | ................. | A45F 3/047 224/632 |
| 5,913,464 A * | 6/1999 | Haberlein | ............... | A45F 3/14 224/259 |
| 5,988,315 A * | 11/1999 | Crane | ...................... | A45F 5/00 182/3 |
| 6,247,624 B1 * | 6/2001 | Rundberg | ............. | F16M 13/04 224/220 |
| 6,315,179 B1 * | 11/2001 | Hillis | ...................... | A45F 3/14 224/200 |
| 6,568,575 B1 * | 5/2003 | Bartholomew | .......... | A45F 3/14 224/258 |
| 7,243,376 B2 * | 7/2007 | Johnson | .................. | F41H 1/02 2/102 |
| 8,020,879 B1 * | 9/2011 | Engdahl | ................... | B62B 9/14 280/30 |
| 8,631,984 B2 * | 1/2014 | Carlsson | .................. | A45F 3/14 224/259 |
| 8,714,424 B2 * | 5/2014 | Oddou | ..................... | A45F 3/04 224/262 |
| 8,910,840 B2 * | 12/2014 | Kamo | ....................... | A45F 3/14 224/150 |
| 8,925,774 B2 * | 1/2015 | Mori | ................... | A01D 34/902 224/259 |
| 9,084,470 B1 * | 7/2015 | Huck | ......................... | A45F 3/14 |
| 9,155,374 B2 * | 10/2015 | Kacmarcik | ............... | A45F 3/14 |
| 9,204,707 B2 * | 12/2015 | Ito | ............................. | A45F 3/14 |
| 9,642,444 B2 * | 5/2017 | Krol | .......................... | A45F 3/14 |
| 2003/0052144 A1 * | 3/2003 | Vardi | ........................ | A45F 3/14 224/258 |
| 2003/0102346 A1 * | 6/2003 | Chen | ........................ | A45F 3/14 224/675 |
| 2006/0108387 A1 * | 5/2006 | Nakaya | ................... | A01D 34/90 224/254 |
| 2009/0090755 A1 | 4/2009 | Menzel et al. | | |
| 2013/0119100 A1 | 5/2013 | Ito et al. | | |
| 2014/0001221 A1 * | 1/2014 | McDonald | ............... | A45F 3/14 224/637 |
| 2014/0151424 A1 * | 6/2014 | Hexels | ..................... | A45F 3/06 224/637 |

FOREIGN PATENT DOCUMENTS

| | | |
|---|---|---|
| EP | 2 594 124 | 5/2013 |
| EP | 2 653 062 | 10/2013 |
| EP | 2 850 965 | 3/2015 |
| WO | 2008/076009 | 6/2008 |
| WO | 2008/076010 | 6/2008 |
| WO | 2008/147256 | 12/2008 |

* cited by examiner

CARRYING DEVICE FOR CARRYING A HAND-GUIDED POWER TOOL TO BE CARRIED BY A USER

BACKGROUND OF THE INVENTION

The invention relates to a carrying device for carrying loads by a user, in particular for carrying a hand-guided power tool such as a trimmer or the like, comprising at least one shoulder strap for resting the carrying device on the shoulder of the user and comprising a lateral leg plate with a connecting unit for coupling the power tool, wherein the leg plate is held by a support strap at the carrying device, wherein one end of the support strap is operatively connected to the shoulder strap, and wherein the leg plate is slidable on the support strap along the support strap.

Carrying devices for carrying loads, for example, when working with a trimmer, are known. They are comprised substantially of a back plate with shoulder straps and a hip belt, wherein a leg plate is held by a support strap at the carrying device. The leg plate comprises on its exterior side which is facing away from the user a connecting unit for coupling the power tool to the carrying device, wherein the weight of the power tool is transferred through the leg plate and the support strap to the carrying device.

According to the principle of a scythe, a trimmer can be moved substantially horizontally for mowing grass, brush, or the like. In this context, the position of the leg plate can change on the support strap, and this may be perceived by the user as disturbing. When vertical work movements have to be carried out with the power tool, as is the case, for example, when working on a slope or when cutting back brush or the like, a displacement of the leg plate along the support strap may however be expedient.

Users work usually with different working techniques. While one user rotates his hip for mowing and does not want the leg plate to automatically move forwardly, another user when mowing grass desires a sliding movement of the leg plate along the support strap.

It is an object of the invention to configure a carrying device for carrying a hand-guided power tool by a user in such a way that a working technique that is preferred by the user can be performed easily while the carrying device, independent of the working technique, can still be used expediently and without causing fatigue.

SUMMARY OF THE INVENTION

This object is solved in that, functionally between the support strap and the leg plate, a fixation device is arranged which comprises a release position and a blocking position. In the release position, the leg plate is slidable along the support strap while in the blocking position the leg plate is non-slidably secured on the support strap. The blocking position can be correlated with a first working mode of the power tool and the release position with a second working mode of the power tool.

The fixation device which is functionally arranged between the support strap and the leg plate remains slidable along the support strap in the release position of the fixation device while the leg plate is non-slidably secured at the support strap in the blocking position of the fixation device. The term non-slidable is to be understood such that the leg plate does not move along the support strap due to working movements.

The term support strap not only encompasses flat straps which, viewed in cross section, have a rectangular cross-sectional shape but also straps with other cross-sectional shapes, for example, a support rope or a similar element.

Due to the configuration of the carrying device according to the invention, the carrying device can be used in a first working mode with the fixation device in the blocking position and in a second working mode with the fixation device in the release position. In this way, the carrying device can be adapted to the preferred working technique of the user as well as to the respective situation of use of the hand-guided power tool, in particular of a trimmer or the like.

Expediently, the leg plate comprises a strap channel for the support strap wherein the support strap extends through the strap channel in the direction of the channel center axis.

The fixation device can be configured such that it comprises a fixation element which, in the blocking position, is moved into the free (open) cross section of the strap channel. Due to the reduced cross section of the strap channel in the blocking position of the fixation device, the support strap cannot be displaced in the strap channel without applying a much greater force so that a fixation is achieved.

In a special embodiment of the invention, the fixation device is held at the leg plate, in particular is configured as a cleat secured on the leg plate. In order to reach the blocking position of this fixation device, the user accesses the support strap through a free (open) channel section of the strap channel, pulls the support strap laterally out of the strap channel, and secures it at the cleat. Expediently, for this purpose the cleat is embodied at a flat side of the leg plate.

In a simple embodiment of the invention, the fixation device is secured on the support strap. For example, the fixation device may comprise a fixation element which is secured on the support strap. An embodiment of the fixation element can be a clip pushed onto the support strap. The fixation element can also be designed such that it engages with form fit the support strap, i.e., penetrates or similarly engages the support strap.

In a further embodiment of the invention, the power tool which is secured at the connecting unit comprises a guide rod and a tool head arranged at one end of the guide rod, wherein the strap channel of the leg plate is positioned at a spacing to the guide rod.

As a further independent invention, it is provided that the support strap is connected in a region between the leg plate and the end of the support strap, which is operatively connected to the shoulder strap by a coupling buckle, to a lateral strap of the carrying device. In this context, it is provided that the coupling buckle is arranged so as to be slidable in the longitudinal direction of the support strap along the support strap. This provides the user with the possibility to adjust, as needed, the connecting point between lateral strap and support strap and also in regard to the requirements of a work situation. In order to secure a selected adjusted position, the coupling buckle advantageously comprises a clamp with at least one actuating part by means of which the coupling buckle can be fixed along the support strap in at least one longitudinal direction. The clamp comprises in particular a spring element that secures the clamp in the blocking position. The spring element is in particular configured as a leg spring. It can be expedient to construct the spring element as one piece together with the clamp.

In an advantageous embodiment of the invention, the coupling buckle comprises two clamps with one actuating part each. The coupling buckle comprises thus two actuating parts. In this context, each clamp prevents sliding of the support strap in one longitudinal direction of the support strap, respectively, so that the coupling buckle is completely fixed on the support strap. In order to be able to slide the coupling buckle along the support strap in both longitudinal directions of the support strap, i.e., to freely move it, both actuating parts must be actuated at the same time, i.e, both clamps must be released.

The arrangement of the actuating parts is selected such that the actuating parts can be together actuated by two fingers of a user. The user, while wearing the carrying device, can thus actuate the clamp with two fingers of one hand, release the clamp, and perform a desired longitudinal adjustment on the support strap. A load relief of the support strap is not necessary for sliding the coupling buckle on the support strap.

A further independent invention is provided in that the leg plate comprises an exchangeable leg cushion. In particular, the leg plate comprises means for detachable connection of the leg cushion. The means are in particular embodied as one piece together with the leg plate. Expediently, the leg plate comprises a support plate wherein a stiff rim of the leg cushion is engaged across by guide bars of the support plate and thereby secured at the support plate. In a simple way, the user can insert a desired or expedient leg cushion on site. When the carrying device is used by another user, the other user can replace an installed leg cushion by his personal leg cushion, in particular without needing a tool for this exchange.

According to a further invention, in a carrying device comprising at least one back plate, at least one shoulder strap, and a hip belt, the back plate is connected by means of at least one partially lockable textile receiving pocket to the hip belt and/or the shoulder strap. In this way, a damaged strap can be simply exchanged or a soiled strap can be simply demounted, washed, and reinstalled. This can be done in particular without using a tool.

This type of connection between a back plate and a hip belt can be employed and utilized advantageously in connection with a carrying system for a rechargeable battery to be carried on the back (backpack battery). Expediently, a rechargeable battery can be arranged on the back plate. The battery can be designed as a battery pack. The battery or the battery pack forms the load which is to be carried by the carrying system according to the invention, wherein the load (back plate with battery pack) is supported by means of the textile pocket, for example, on a hip belt. The battery or the battery pack serves for operating an electric power tool.

In a further embodiment of the carrying system, a suspension device for a power tool, for example, an electric power tool, can be provided at the back plate of the carrying system. It can also be advantageous to carry the power tool at the hip belt. Also, the power tool can be held by the user exclusively by hand.

Advantageously, the textile receiving pocket is embodied at the hip belt and/or at the shoulder strap wherein a section of the back plate is held so as to be easily demountable in the receiving pocket. For this purpose, it can be expedient when the section of the back plate which is held in the receiving pocket is secured by means of a flap in the textile receiving pocket, wherein the flap is particularly made of textile material.

Further advantageous embodiments and expedient features result by any combination of the aforementioned features and the described embodiments.

Further features of the invention result from the additional claims, the description, and the drawing in which embodiments of the invention are illustrated which will be described in the following in detail.

DESCRIPTION OF THE PREFERRED EMBODIMENTS

Figure 1:
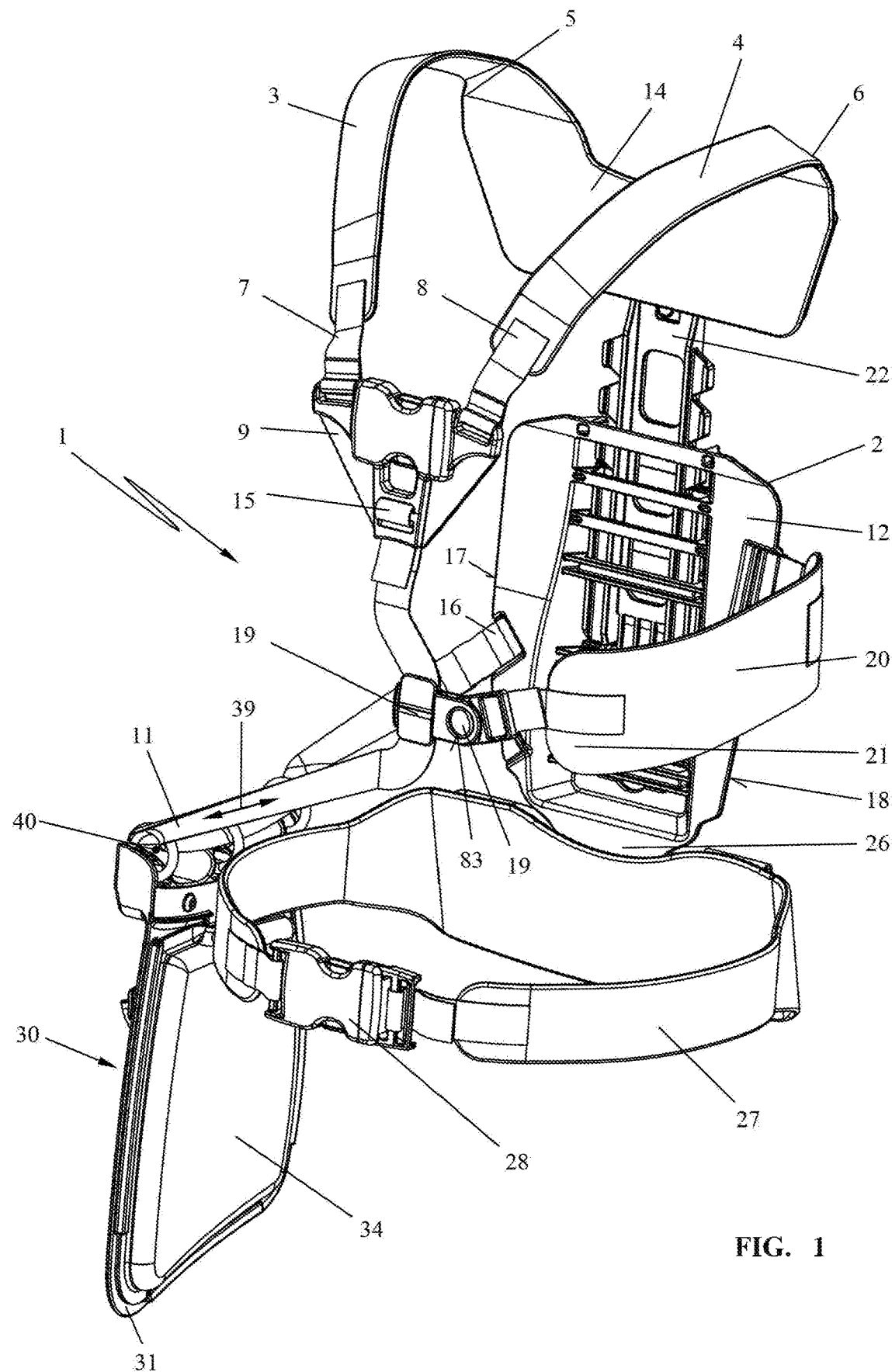
FIG. 1 is a perspective illustration of a carrying device comprised of back plate, hip belt, shoulder straps, lateral strap, and support strap for a leg plate with a leg cushion.
Figure 2:
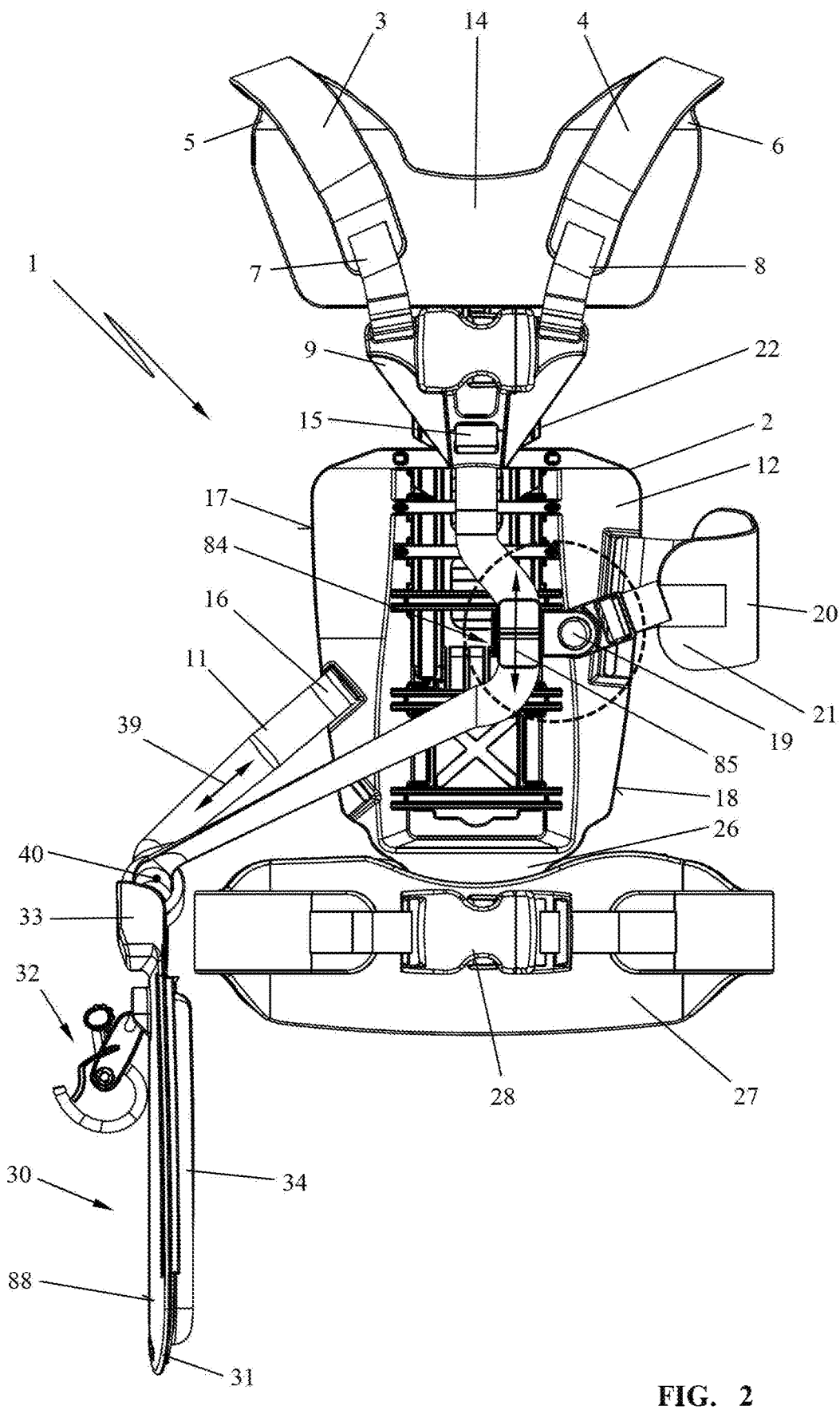
FIG. 2 is a front view of the carrying device according to FIG. 1.

In FIGS. 1 through 9, a first embodiment of a carrying device 1 according to the invention is illustrated which is provided for using a power tool 10 such as a trimmer, motor scythe, scrub cutter, or brushcutter or the like, as illustrated schematically in FIGS. 37 to 40.

The carrying device 1 illustrated in the embodiment of FIGS. 1 through 9 comprises substantially a back plate 2 which is comprised of a base plate 12 and a pull-out element 22 secured on the base plate 12 in a telescoping fashion. At the top end 23 of the pull-out element 22, a ball joint 24 is arranged which supports a mounting plate 25. The mounting plate 25 is fixed in a receiving pocket 13 of a shoulder strap unit 14. The shoulder strap unit 14 comprises two shoulder straps 3 and 4 whose rear ends 5 and 6 are connected to each other by shoulder strap unit 14. The front ends 7, 8 of the shoulder straps 3, 4 are connected to a chest plate 9 in the embodiment.

A support strap 11 extends away from the chest plate 9 downward to a leg plate 30 and from there laterally back to the base plate 12 of the back plate 2. The support strap 11 is connected with one end 15, preferably length-adjustably, to the chest plate 9 or expediently to a buckle at the chest plate 9. The other end 16 of the support strap 11 is connected, preferably length adjustably, to the bottom lateral section of the base plate 12 of the back plate 2. The support strap 11 is in particular fastened at the base plate 12 adjacent to a (first) longitudinal edge 17 of the base plate 12.

Figure 3:
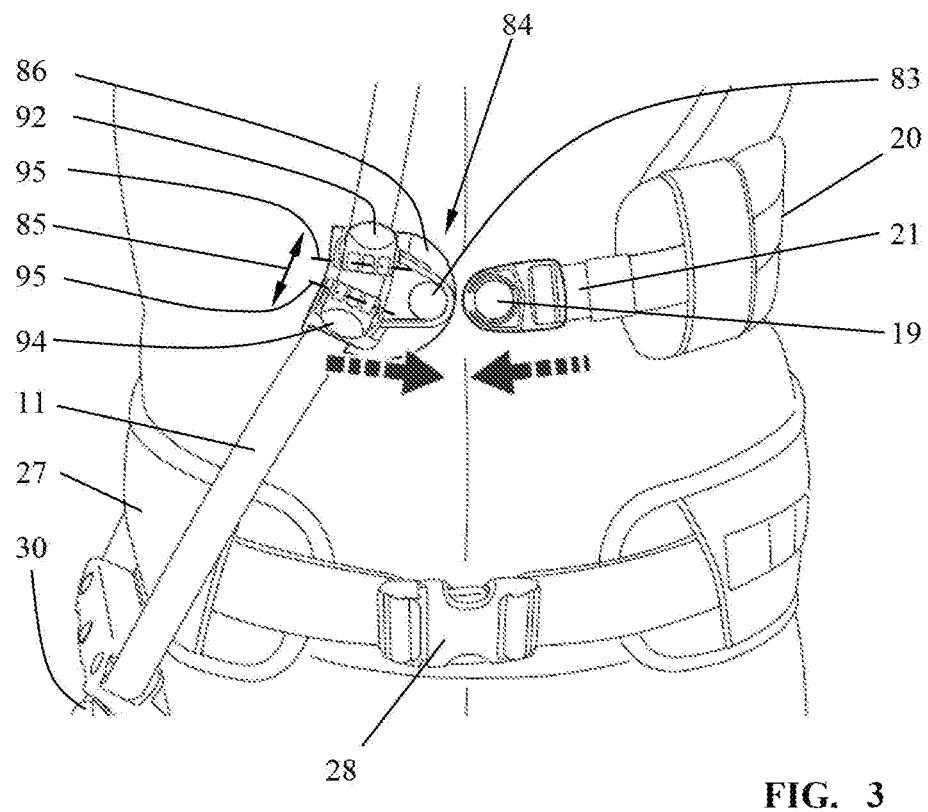
FIG. 3 is a detail view of the chest side of the carrying device with a coupling buckle slidable on the support strap.
Figure 4:
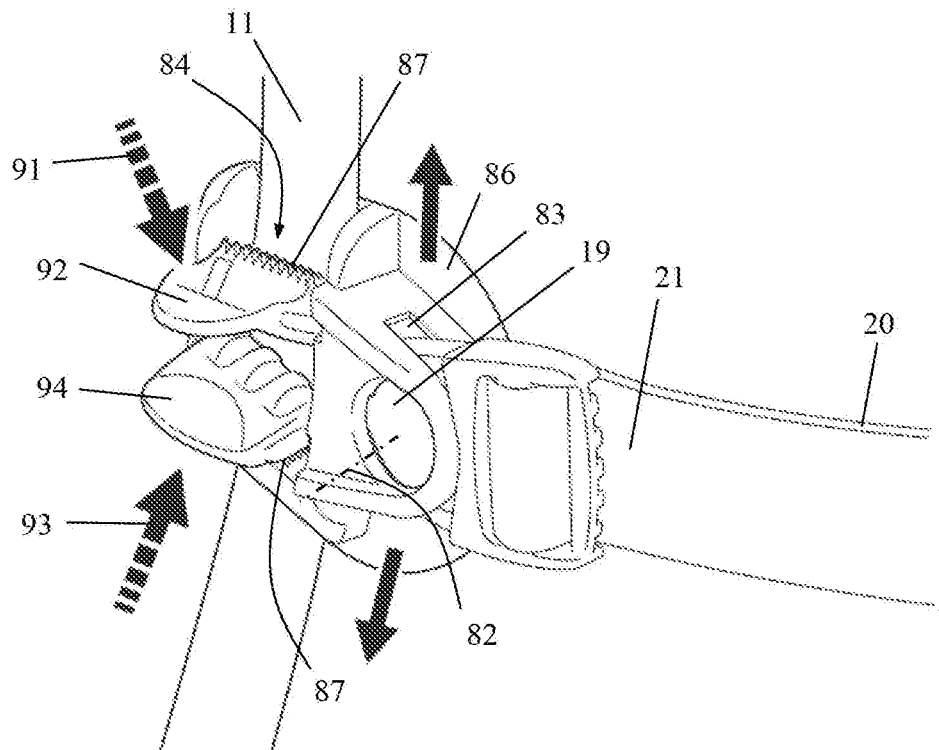
FIG. 4 is an enlarged detail illustration of the coupling buckle according to FIG. 3 with hooked lateral strap and actuated actuating parts.
Figure 5:
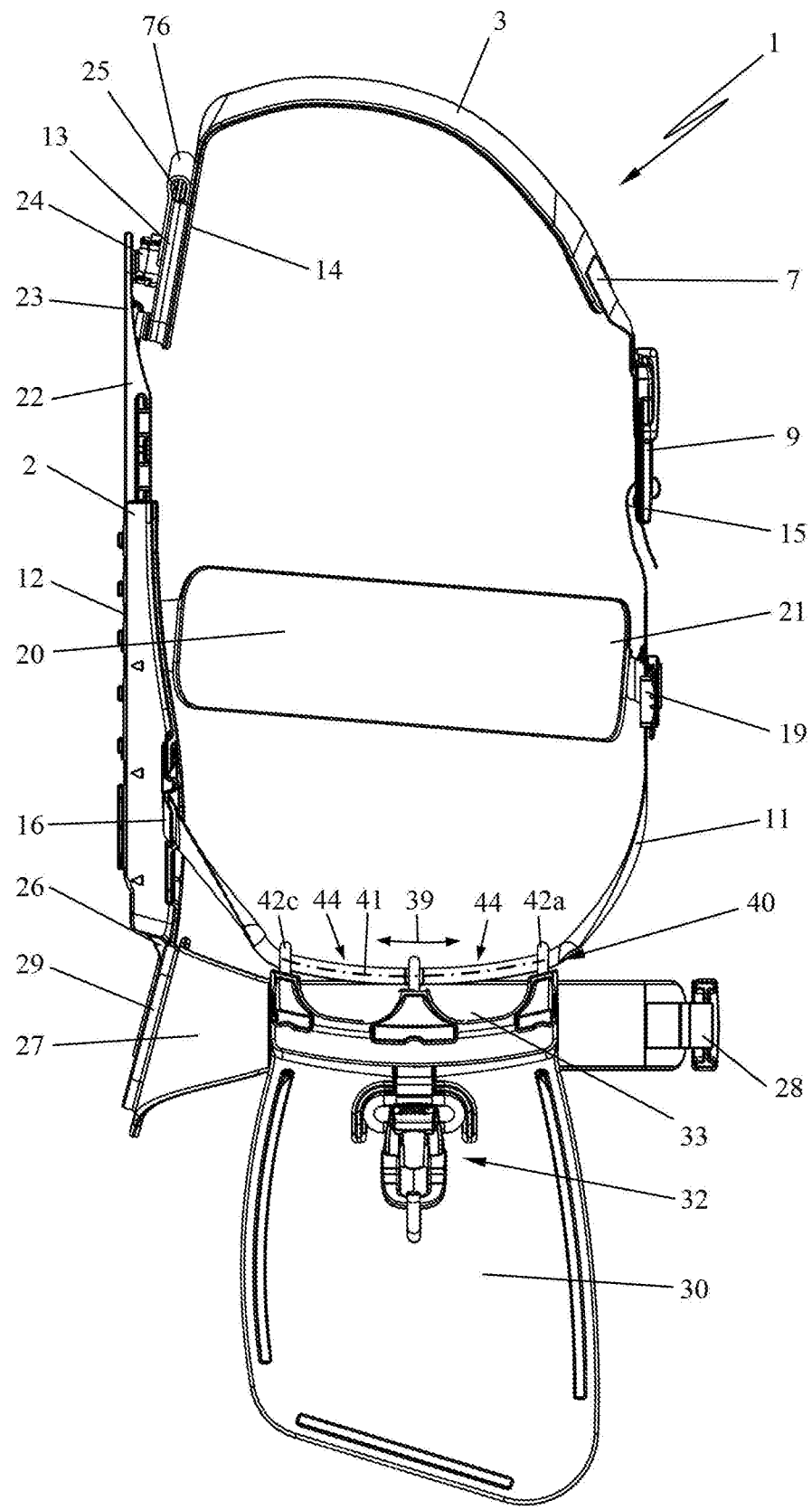
FIG. 5 is a side view of the carrying device of FIG. 1 looking onto the leg plate.

At the second longitudinal edge 18 of the base plate 12 which is opposite the first longitudinal edge 17 of the base plate 12, a lateral strap 20 is attached in the region of the top section of the base plate 12. The front end 21 of the lateral strap 20 is connected by a connecting element 19 to a coupling buckle 84 arranged at the support strap 11. The coupling buckle 84 is illustrated in FIGS. 3 and 4 in enlarged illustration; in FIG. 4, it is shown that coupling buckle 84 is slidable along the support strap 11.

The coupling buckle 84, which in particular constitutes an independent invention, is held on the support strap 11 between the leg plate 30 and the chest plate 9. The coupling buckle 84 comprises a blocking state and a release state. In the blocking state, any movement of the coupling buckle 84 in the longitudinal direction of the support strap 11 in the direction of double arrow 85 (FIG. 3) is blocked. Preferably, the clamps 87 of the coupling buckle 84 are self-locking in both directions of the double arrow 85. In the release position of the clamps 87, the coupling buckle 84 and thus the connecting element 19 as a front end 21 of the lateral strap 20 can slide continuously along the support strap 11.

The clamp 87 comprises in particular a spring element, not illustrated in detail, that secures the clamp 87 in the blocking position. The spring element can be in particular embodied as a leg spring. It can be expedient to configure the spring element as one piece together with the clamp 87.

In the embodiment, the coupling buckle 84 comprises two clamps 87 with oppositely movable actuating parts 92, 94. Each one of the actuating parts 92, 94 is acting on one clamp 87, respectively. Each clamp 87 prevents a sliding action along one longitudinal direction of the support strap 11, respectively. In order to slide the coupling buckle 84 in one direction along the support strap 11, at least one clamp 87 is actuated advantageously by means of one actuating part 92 or 94. In particular, both actuating parts 92 and 94 can be released together with one hand so that the coupling buckle 84 can slide freely along the support strap 11 in both directions. As illustrated in FIG. 4, both actuating parts 92 and 94 are moved toward each other in the direction of arrows 91 and 93. In this way, the clamping action of the actuating part 92 with the support strap 11 and the clamping action of the other actuating part 94 with the support strap 11 are canceled. Advantageously, the pivot axis 95 of the actuating parts 92, 94 are positioned angularly relative to each other. In this way, a one-hand actuation by the user is facilitated.

The coupling buckle 84 comprises a receptacle 83 for the connecting element 19 which forms the end of the lateral strap 20. The connecting element 19 is secured pivotably in the plane of the coupling buckle 84 in the receptacle 83. A pivot axis 82 of the connecting element 19 in the receptacle 83 is positioned perpendicular to the buckle plate 86. The coupling buckle 84 is arranged on the buckle plate 86. The connection of receptacle 83 and connecting element 19 is embodied advantageously as a snap connection.

The sliding displacement of the coupling buckle 84 along the support strap 11 is possible with one hand and under load, i. e., without releasing or relieving the carrying device 1 or its individual straps such as the support strap 11 or the lateral strap 20. The sliding displacement of the coupling buckle 84 on the support strap 11 is possible in particular continuously and without canceling the connection between lateral strap 20 and support strap 11. The lateral strap 20 is thus not decoupled from the support strap 11 but only moved along the support strap 11 into another position. For moving the lateral strap 20, the actuating parts 92 and 94 are pivoted by two fingers of the user together in the direction of arrows 91 and 93 toward each other. The unlocked (released) coupling buckle 84 can now be moved in the direction of double arrow 85 along the support strap 11 as desired by the user. In this context, the connecting member 19 can pivot in the receptacle 83. Alignment of the lateral strap 20 is not impaired.

The front end 21 of the lateral strap 20 is positioned always below the chest plate 9. Twisting of the chest plate 9 caused by tensile forces introduced by the support strap 11 into the chest plate 9 can be reduced because the lateral strap 20 is connected below the chest plate 9 to the support strap 11 and, therefore, a portion of the forces can be introduced already through the lateral strap 20 into the back plate 2.

By longitudinal displacement or movement of the coupling buckle 84 along the support strap 11, the force distribution between the shoulder strap 3 and the lateral strap 20 changes. A user can utilize this in order to vary from time to time the load acting on him. By one-handed operation of the coupling buckle 84, an adjustment of the load distribution is thus possible without having to take off the carrying device 1 and in particular is possible while working.

The bottom end of the back plate 2, in the embodiment the bottom end 26 of the base plate 12, carries a hip belt 27 which can be closed by a front closure 28.

Figure 6:
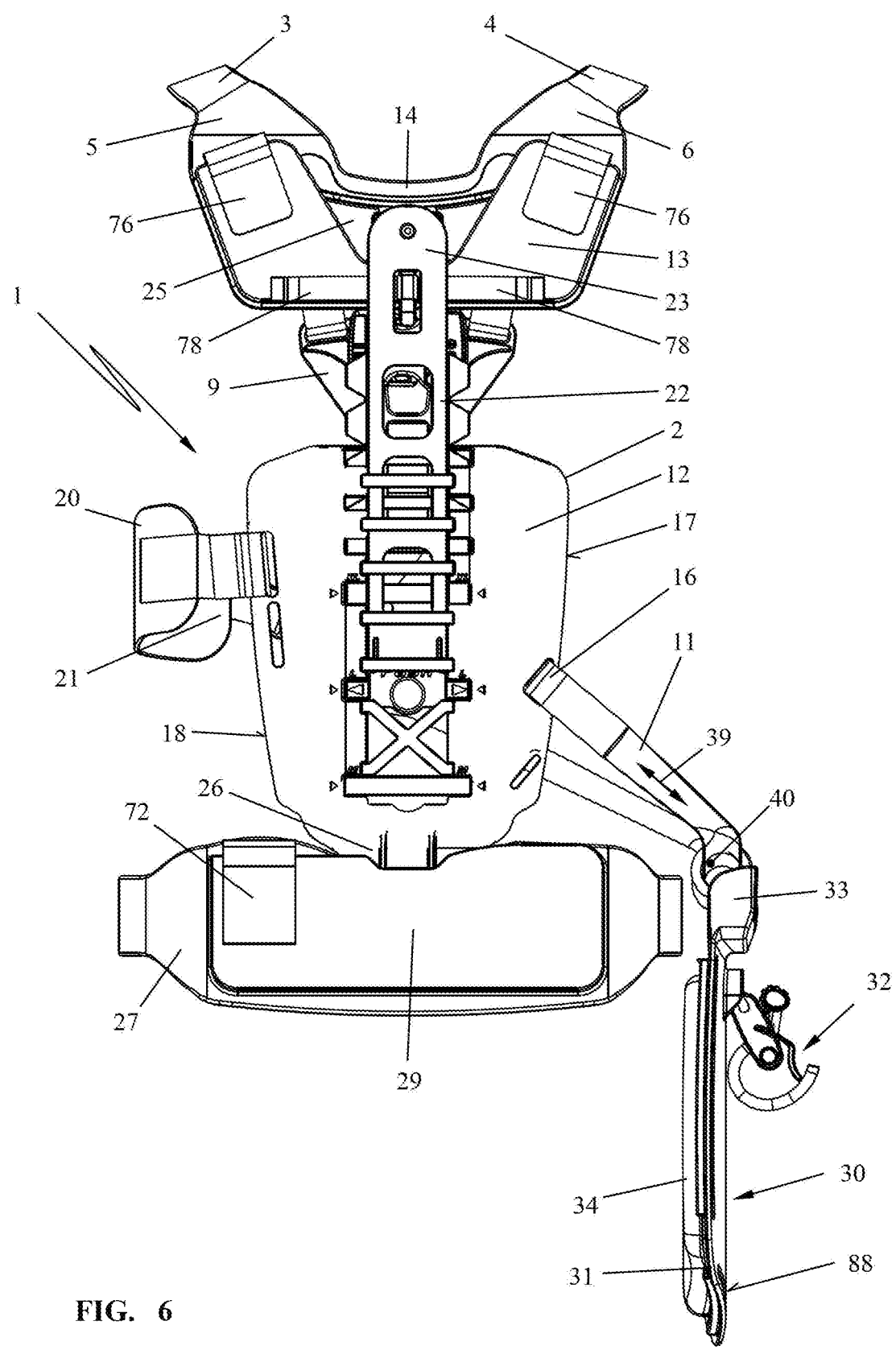
FIG. 6 is a rear view of the carrying device of FIG. 1.
Figure 7:
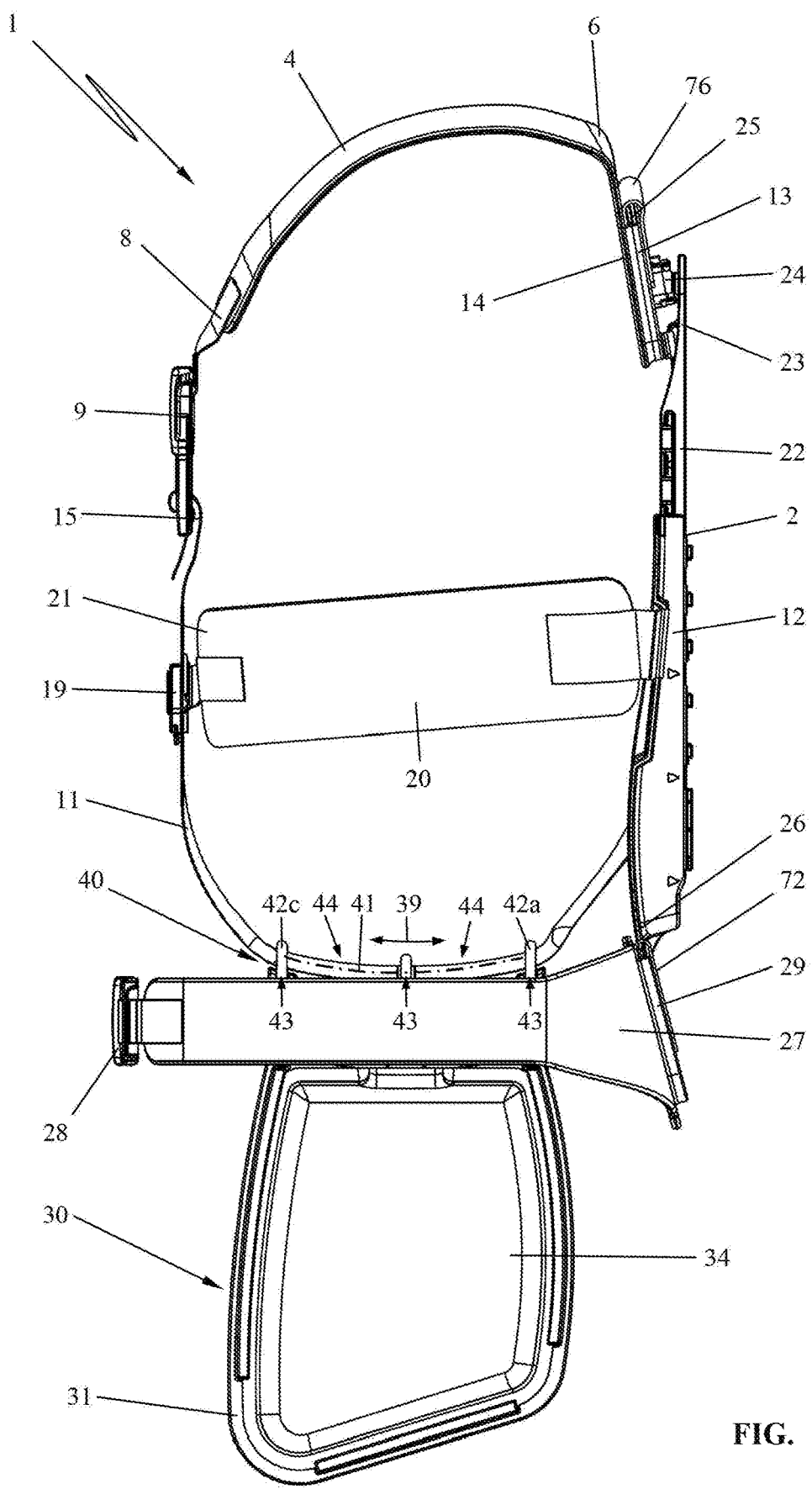
FIG. 7 is a side view of the carrying device looking onto the lateral strap.
Figure 8:
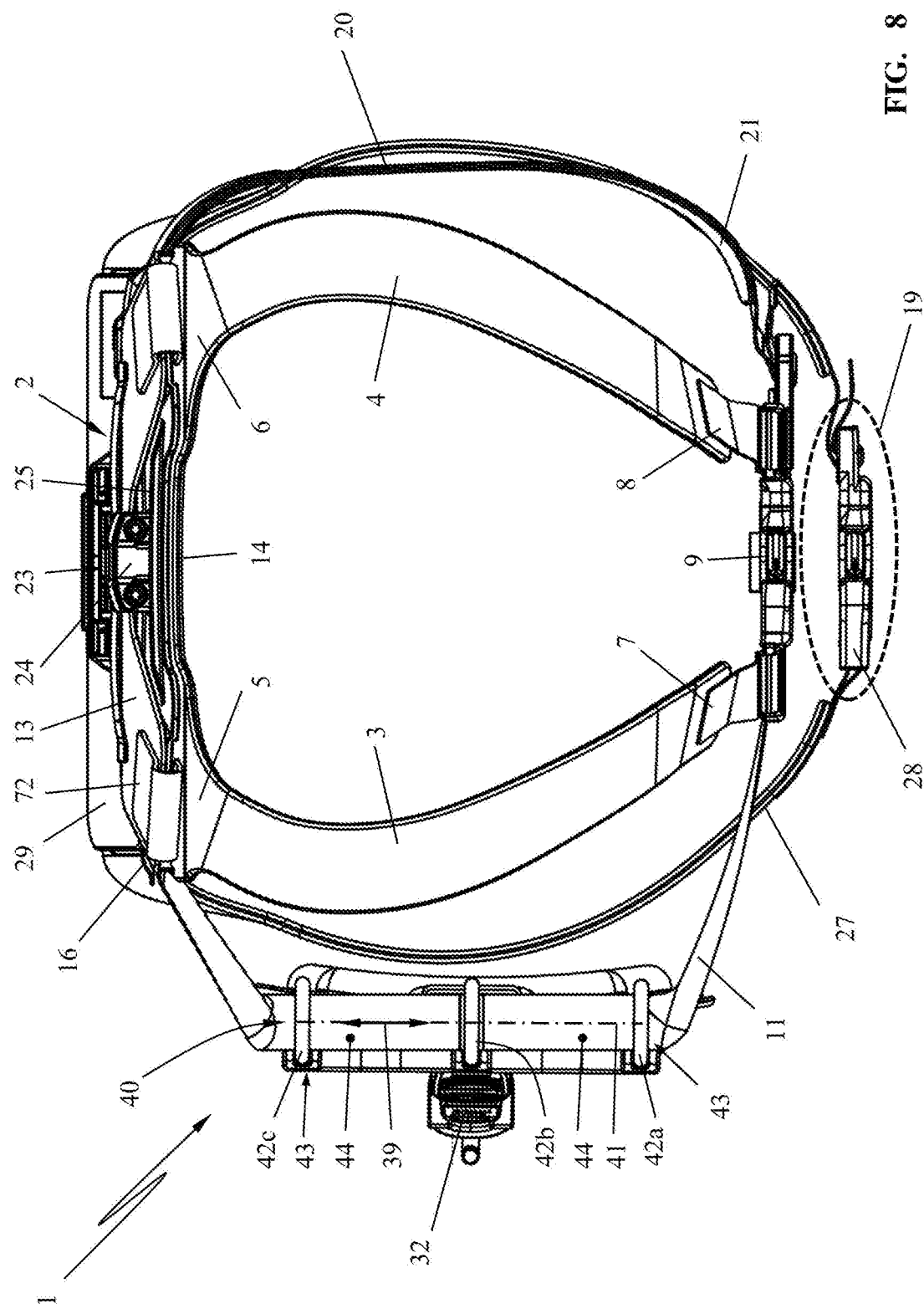
FIG. 8 is a top plan view of the carrying device of FIG. 1.
Figure 9:
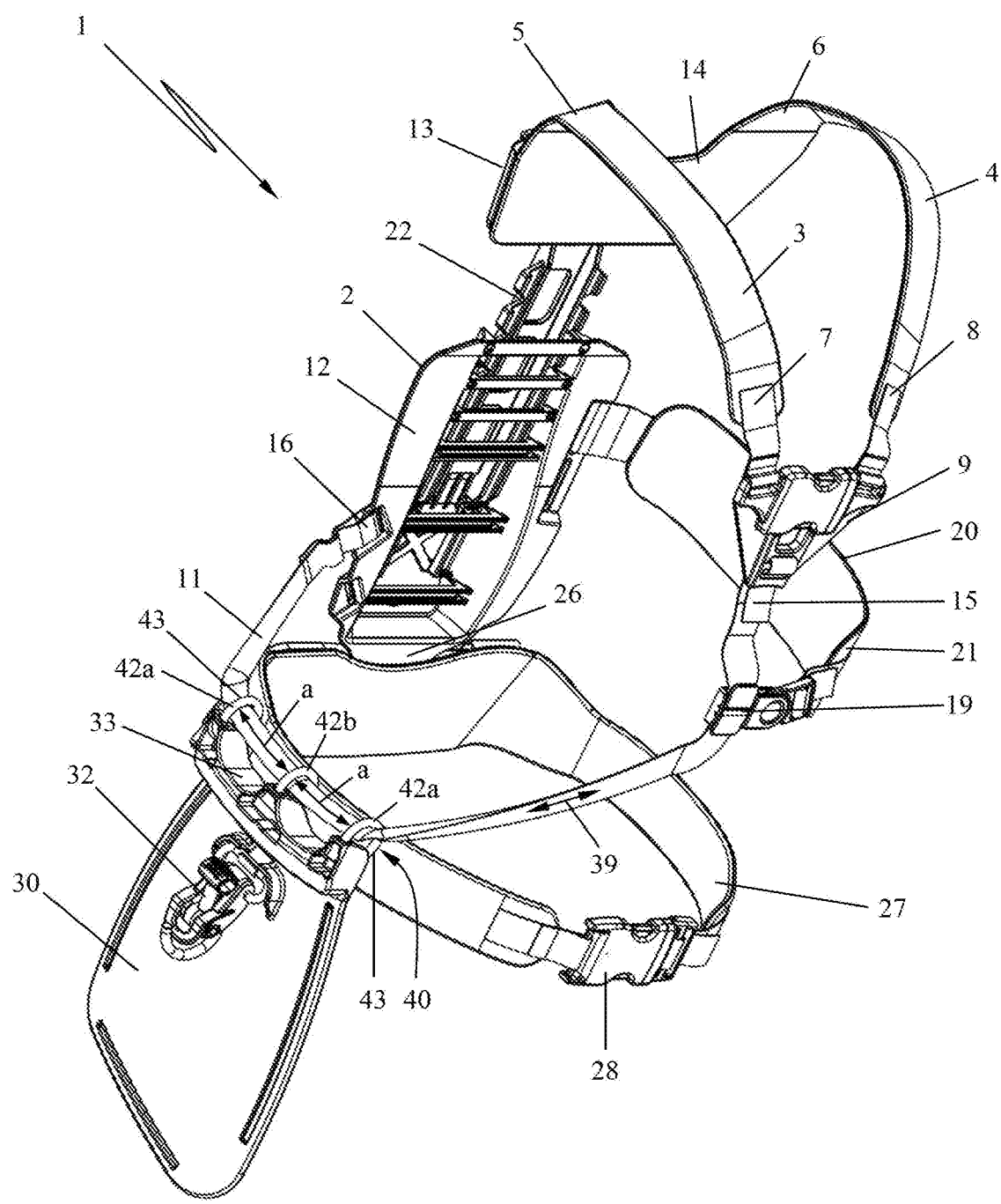
FIG. 9 is a further perspective illustration of the carrying device according to FIG. 1 looking onto the leg plate.
Figure 28:
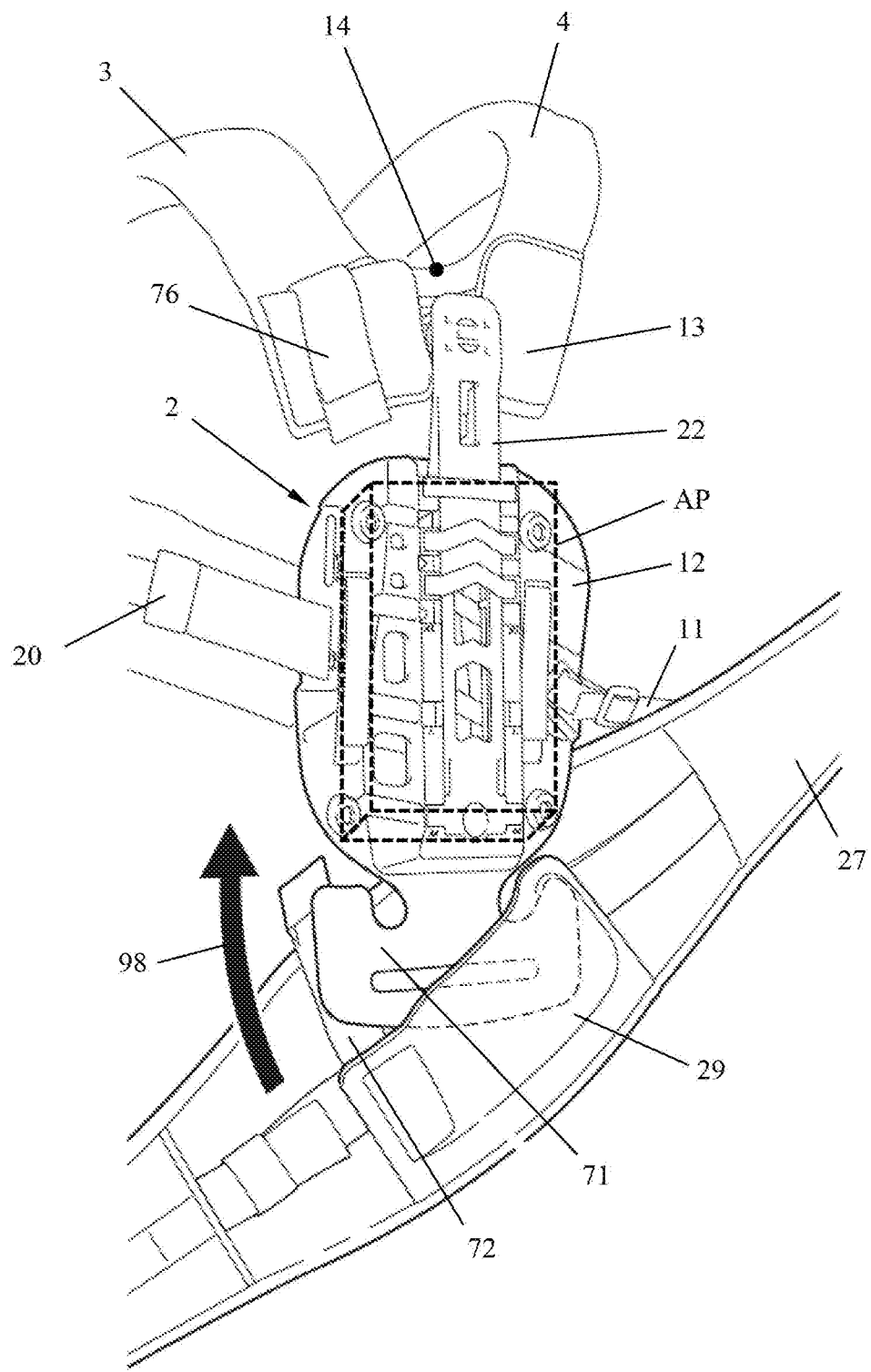
FIG. 28 is a view of the back plate of a carrying device with a detachable connection between the back plate and the hip belt by means of a lockable textile pocket.

As can be seen in the view from the rear according to FIG. 6, at the hip belt 27 a textile receiving pocket 29 is formed in which the bottom end 26 of the back plate 2 is received. FIG. 28 shows how the end 26 of the back plate 2 can be removed from the textile receiving pocket 29. First, a flap 72 is to be released that engages across an end flange 71 of the bottom end 26. Subsequently, the bottom end 26 of the back plate 2 can be pivoted in the direction of the arrow out of the textile receiving pocket 29.

Assembly is correspondingly realized in reverse sequence as will be explained in the following. The detachable connection of the back plate 2 with the hip belt 27, and other elements of the carrying device 1, constitutes in particular also an independent invention.

In the following, different embodiments of a leg plate 30 with differently designed strap channel 40 and different fixation devices 50 functionally arranged between the support strap 11 and the leg plate 30 will be described. The described inventions are not limited to the illustrated embodiments but concern generally leg plates with different strap channels. In this context, the strap channel can be embodied at the support plate, for example, to be integral therewith or separate therefrom, in a closed or interrupted embodiment, and the channel cross section can be in particular flat or round. The support strap 11 in the embodiment is configured as a strap but can also be embodied as a rope or a similar connecting means.

The leg plate 30 in the first embodiment is comprised of an in particular stiff support plate 31 which carries a connecting unit 32. The connecting unit 32 is positioned at a spacing x (FIG. 37) below a top rim portion 33 of the support plate 31. At the top rim portion 33 of the support plate 31, a strap channel 40 is formed which comprises a channel center axis 41. In longitudinal direction of the channel center axis 41, the support strap 11 is passed through the strap channel 40 wherein the support plate 31 is arranged to be slidable on the support strap 11 in the direction of double arrow 39.

The channel center axis 41 of the strap channel 40 can extend straight; advantageously, the channel center axis 41 extends slightly curved. In particular, the extension of the channel center axis 41 is approximated to the course of the support strap 11 in the region of the leg plate 30.

As can be seen in particular in FIGS. 5, 6, 7, 8, and 9, the strap channel 40 in a first embodiment is comprised of individual channel sections 42a, 42b, 42c which are positioned at a spacing a relative to each other in direction of the channel center axis 41. The spacings a are identical in the illustrated embodiment of FIGS. 1, 2, 5 through 9. However, it can be advantageous to design the spacings a between the channel sections 42a, 42b, 42c to be different from each other.

Figure 10:
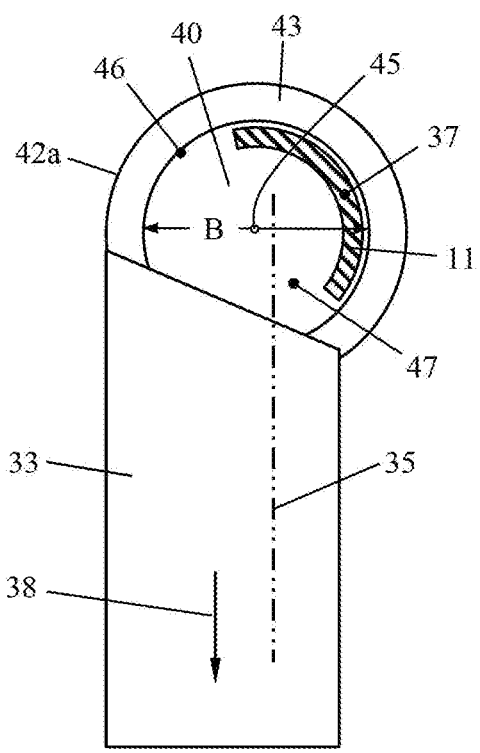
FIG. 10 is a schematic illustration of the strap channel provided on the leg plate in a first embodiment showing the extension of the support strap.

In a carrying device 1 for carrying a hand-guided power tool 10 by a user, comprising at least one shoulder strap 3, 4 and a lateral leg plate 30 with a connecting unit 32 for coupling the power tool 10 to the carrying device 1, it can be advantageous to design the channel cross section area 47 of the strap channel 40 of the leg plate 30 at least twice as large, in particular three times as large, and at most 10 times as large, as the strap cross section area 37, as shown, for example, in FIG. 10.

In the first embodiment, the strap channel 40 is formed by channel sections 42a, 42b, 42c in the form of strap eyes 43. The strap eyes 43 are comprised advantageously of metal and are held in the material of the leg plate 30. Preferably, the support plate 31 is formed for this purpose with a thicker rim portion 33 which is thicker that the rest of the support plate 31. The configuration of the channel sections 42a, 42b, 42c by strap eyes 43 is one of several possibilities. Additional embodiments described in the following provide alternative configurations for configuring the strap channel 40. Independent of the type of configuration of the strap channel 40, the indicated advantages and features can be transferred and applied to all embodiments.

The leg plate 30 supports at its exterior side 88 facing away from its connecting unit 32 for the power tool 10 a leg cushion 34 that is in particular flat.

The back plate 2 is configured such that the pull-out element 22 as well as the base plate 12 each can be manufactured as a one-piece (monolithic) injection molded part.

The illustrated carrying device 1 for carrying a hand-guided power tool 10 by a user 99 (FIGS. 37 to 40) is put on by the user such that the shoulder straps 3, 4 are resting on the shoulder of the user 99 for supporting the carrying device 1. The lateral leg plate 30 is secured by the support strap 11 at the carrying device 1. One end 15 of the support strap 11 is operatively connected to the shoulder straps 3 and 4. In the illustrated embodiment, the operative connection is ensured by the chest plate 9, wherein the front ends 7, 8 of the shoulder straps 3, 4 are secured fixedly at the base of the chest plate 9 while the end 15 of the support strap 11, preferably by means of a releasable plug-in connection, is connected in the region of the bottom side of the chest plate 9 with the chest plate.

The support strap 11 extends through strap channel 40 wherein the channel sections 42a, 42b, 42c are preferably formed by the strap eyes 43 and are positioned at a spacing a relative to each other. There is thus a free (open) space 44 between the channel sections 42a, 42b, 42c and the support strap 11 is disposed without any guiding action in this free space 44.

In FIG. 10, the strap eye 43 of a channel section 42a is illustrated schematically. The center 45 is positioned beyond the plane 35 of the support plate 31 wherein the plane 35 in circumferential direction of the leg plate 30 is embodied to be slightly curved. The center 45 is positioned at the side of the plane 35 where the connecting unit 32 is positioned. The maximal width B of the strap channel 40 corresponds advantageously to at least twice the strap width divided by π. The support strap 11 comprises advantageously a strap cross-section shape that has an angular contour. A suitable cross section shape of the support strap 11 is a rectangular shape.

When the leg plate 30 is subjected to a weight force in the direction of arrow 38 according to FIG. 10, this force is introduced through the strap eye 43 into the support strap 11 that, due to its flexibility, contacts and follows snuggly the contour of the curvature of the strap eye 43. In the load situation, the support strap 11 is substantially positioned on the side of the plane 35 of the support plate 31 which carries the leg cushion 34.

In FIGS. 11 through 16, a further embodiment of the leg plate 30 is illustrated and will be explained in the following in detail.

Figure 15:
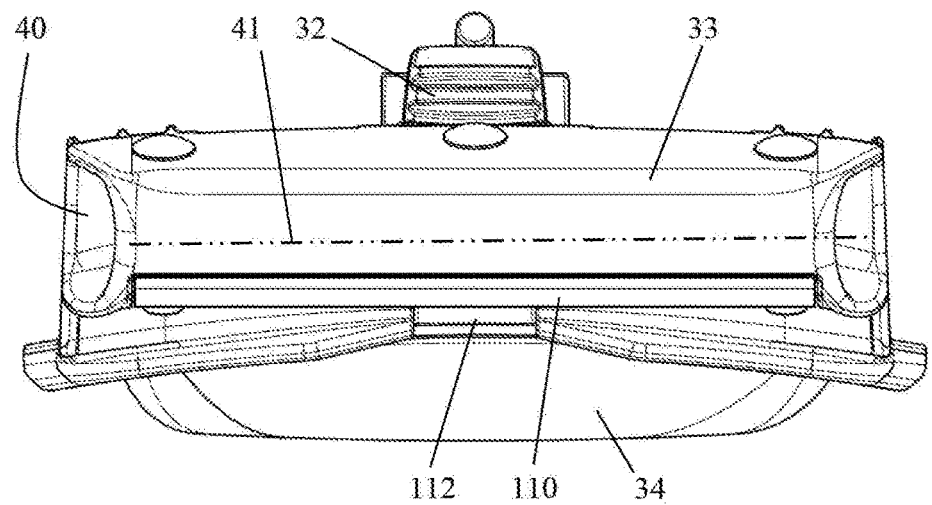
FIG. 15 is a top plan view of the leg plate according to FIG. 13.
Figure 16:
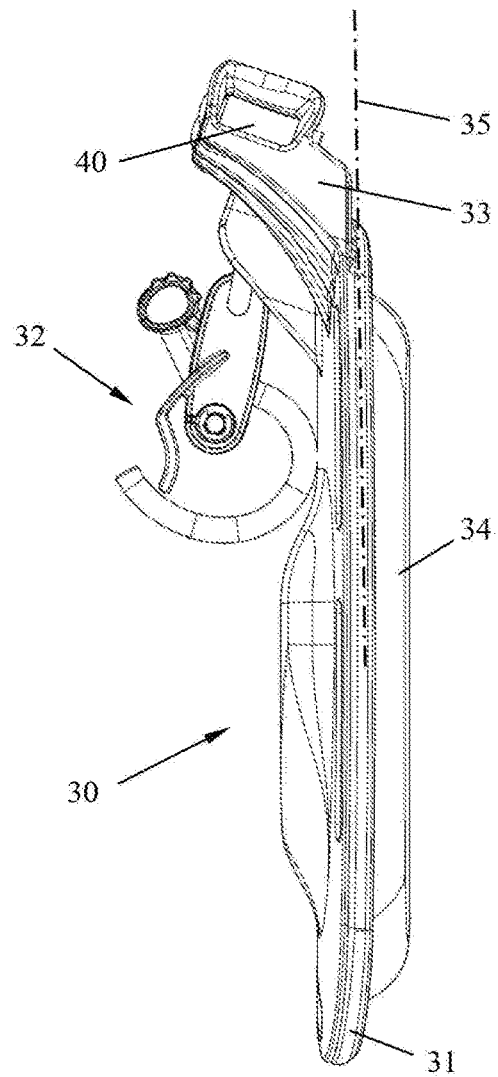
FIG. 16 is a side view of the leg plate according to FIG. 13.

The basic configuration of the leg plate corresponds to that of the leg plate 30 illustrated in FIGS. 1, 2 and 5 through 9 and differs from it only in respect to providing a different embodiment of the strap channel 40. The leg plate 30 is comprised generally of a support plate 31, in particular a hard plate, which has a top rim portion 33. The top rim portion 33, as shown in particular in FIGS. 15 and 16, is thicker that the rest of the support plate 31. The inner side of the support plate 31 is facing the user 99, the exterior side 88 is facing away from the user. The connecting unit 32 is positioned on the exterior side 88 of the support plate 31 which is facing the power tool 10.

On the inner side of the support plate 31 which is facing away from the connecting unit 32, a leg cushion 34 is arranged that is in particular flat.

Figure 11:
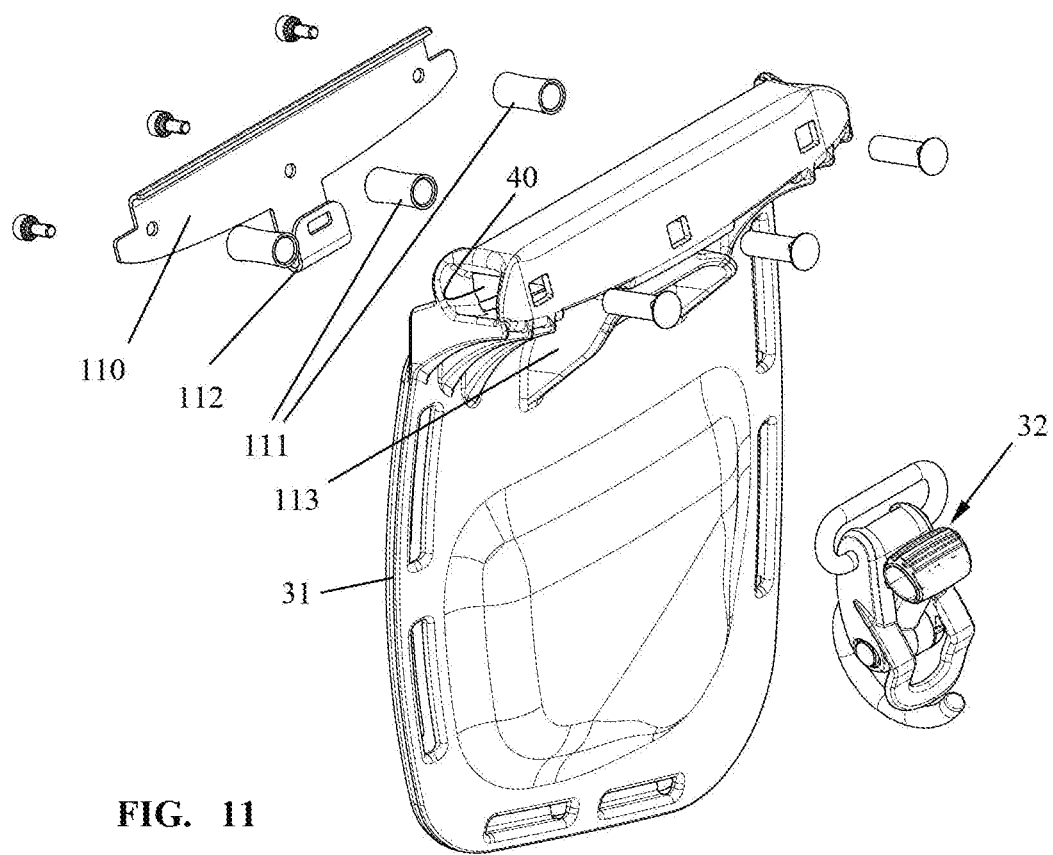
FIG. 11 is a perspective illustration of a further embodiment of the leg plate with strap channel and auxiliary parts.

As illustrated in particular in FIG. 11, at the top rim portion 33 of the leg plate 30 the strap channel 40 is extending. At its bottom side, the strap channel 40 has cutouts. The inner longitudinal side of the strap channel 40 which is facing the user is closed off by a closure cover 110. In the strap channel 40 the support strap 11 which is embodied as a flat strap (FIG. 13) is guided on rollers 111 which are movably supported in the strap channel 40. The closure cover 110 serves to provide an inward bearing action for the rollers 111. In the embodiment, a tongue 112 of the closure cover 110 extends through an opening 113 from the inner side of the support plate 31 to the exterior side of the support plate 31 (see FIGS. 11 and 13). The tongue 112 is connected to the connecting unit 32. The closure cover 110 is in particular metallic.

Figure 12:
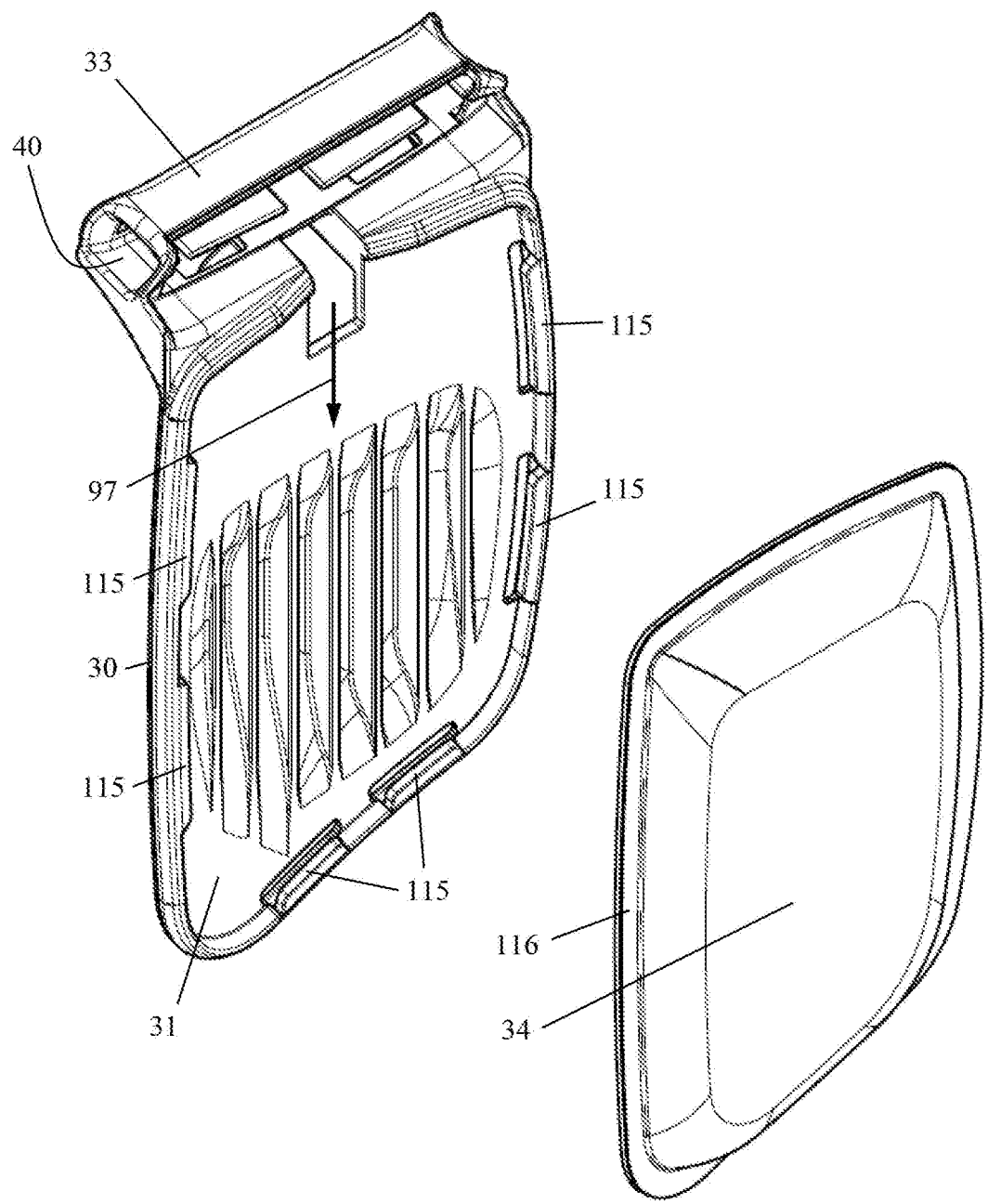
FIG. 12 is a perspective view of the base body of the leg plate according to FIG. 11 with exchangeable support cushion.
Figure 13:
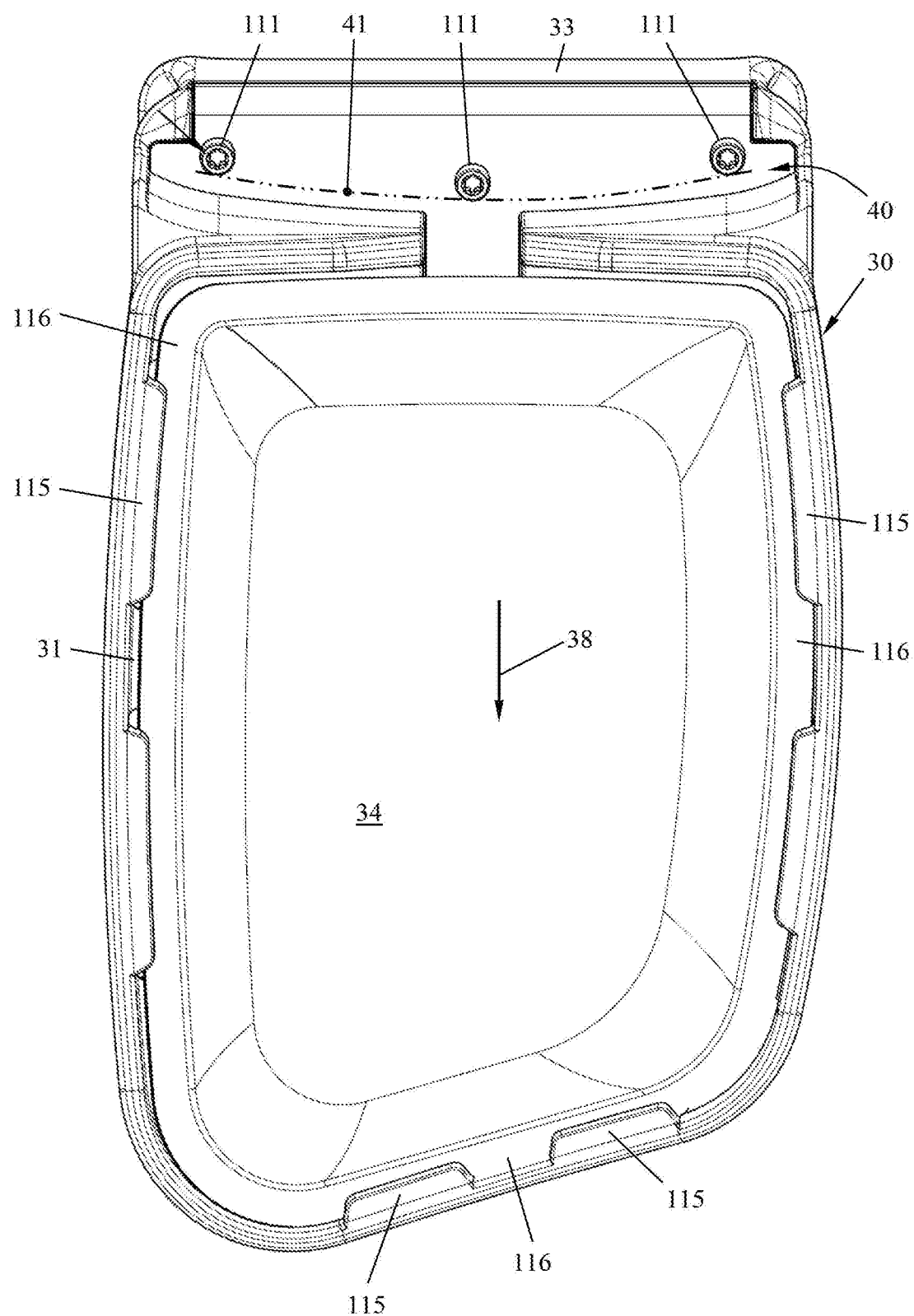
FIG. 13 is a view of the cushion side of the leg plate.
Figure 14:
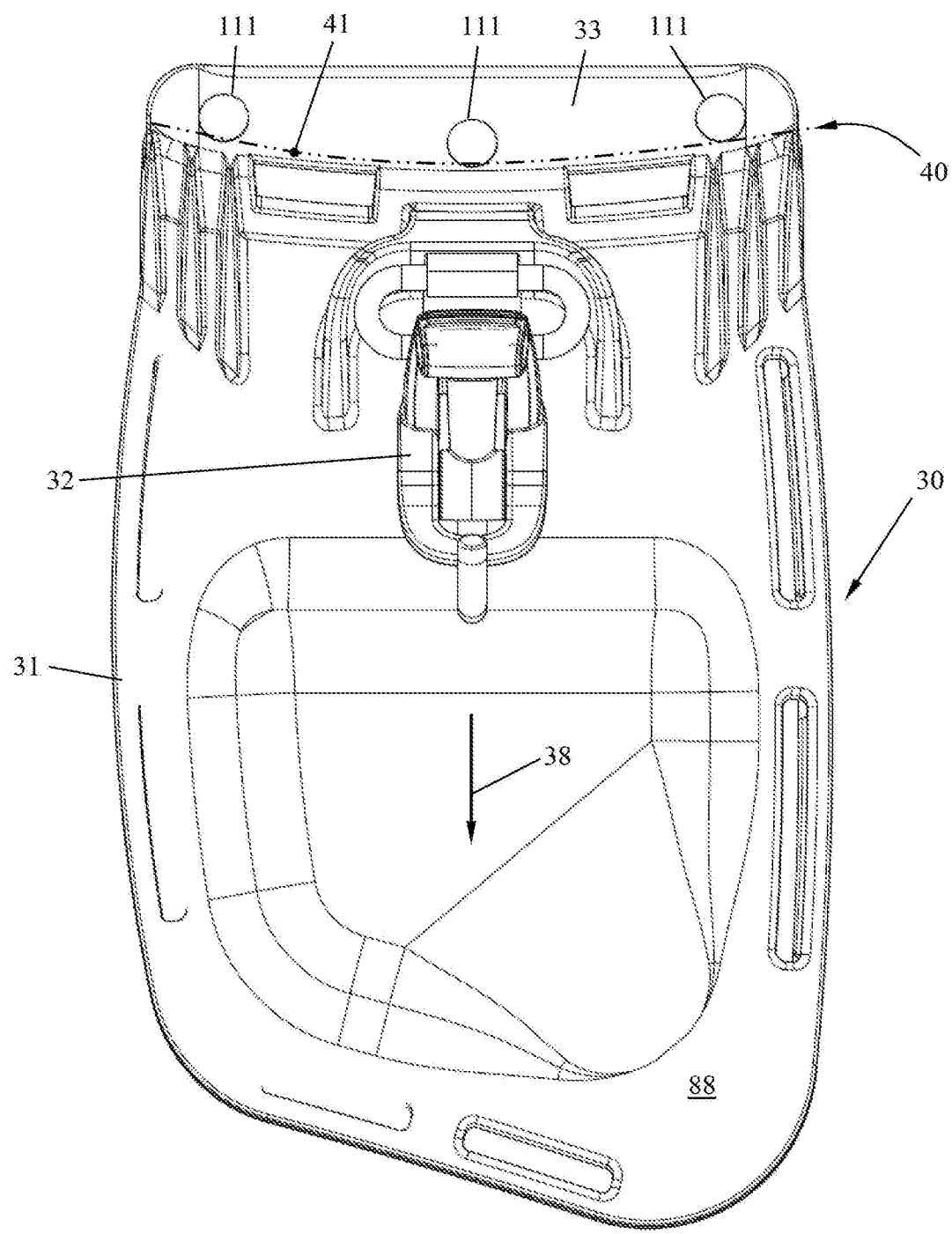
FIG. 14 is a view of the support side of the leg plate according to FIG. 13.

In particular as an independent invention, the leg cushion 34 is advantageously exchangeably supported at the leg plate 30, as shown in FIGS. 12 and 13. In particular, the leg plate 30 comprises means for detachable connection of the leg cushion 34. These means are in particular monolithically formed with the support plate 31 of the leg plate 30.

In particular, it is provided that the leg plate 30 at its rims is provided with guide bars 115 provided as means for detachable connection of the leg cushion 34. The guide bars 115 engage across a stiff rim 116 of the leg cushion 34 and secure it at the support plate 31. Preferably, the leg cushion 34 is pushed in the direction of arrow 97 (FIG. 12) parallel to the leg plate 30 between the guide bars 115 into the leg plate 30. The inner side of the leg plate 30 and the guide bars 115 form a receiving pocket for the leg cushion 34. The leg cushion 34 is thus exchangeably arranged and can be designed in a particular advantageous way in accordance with the demands and specifications of the user.

The guide bars 115 are formed as one piece (monolithic) with the leg plate 30. The guide bars 115 have an L-shape cross section with which they project from the plane of the leg plate 30 and engage about the leg cushion 34. The support plate 31 of the leg plate 30 has openings (see FIGS. 11, 13) arranged congruent to the guide bars 115.

Advantageously, several guide bars 115 are provided wherein the guide bars 115 extend along the circumferential rim of the support plate 31 of the leg plate 30. The guide bars 115 are advantageously spaced apart in circumferential direction relative to each other. It can be provided that the guide bars 115 have a different spacing relative to the circumferential rim of the leg plate 30. Also, the length of the guide bars 115 or the ratio between length and spacing of neighboring guide bars 115 can be adjusted.

Figure 17:
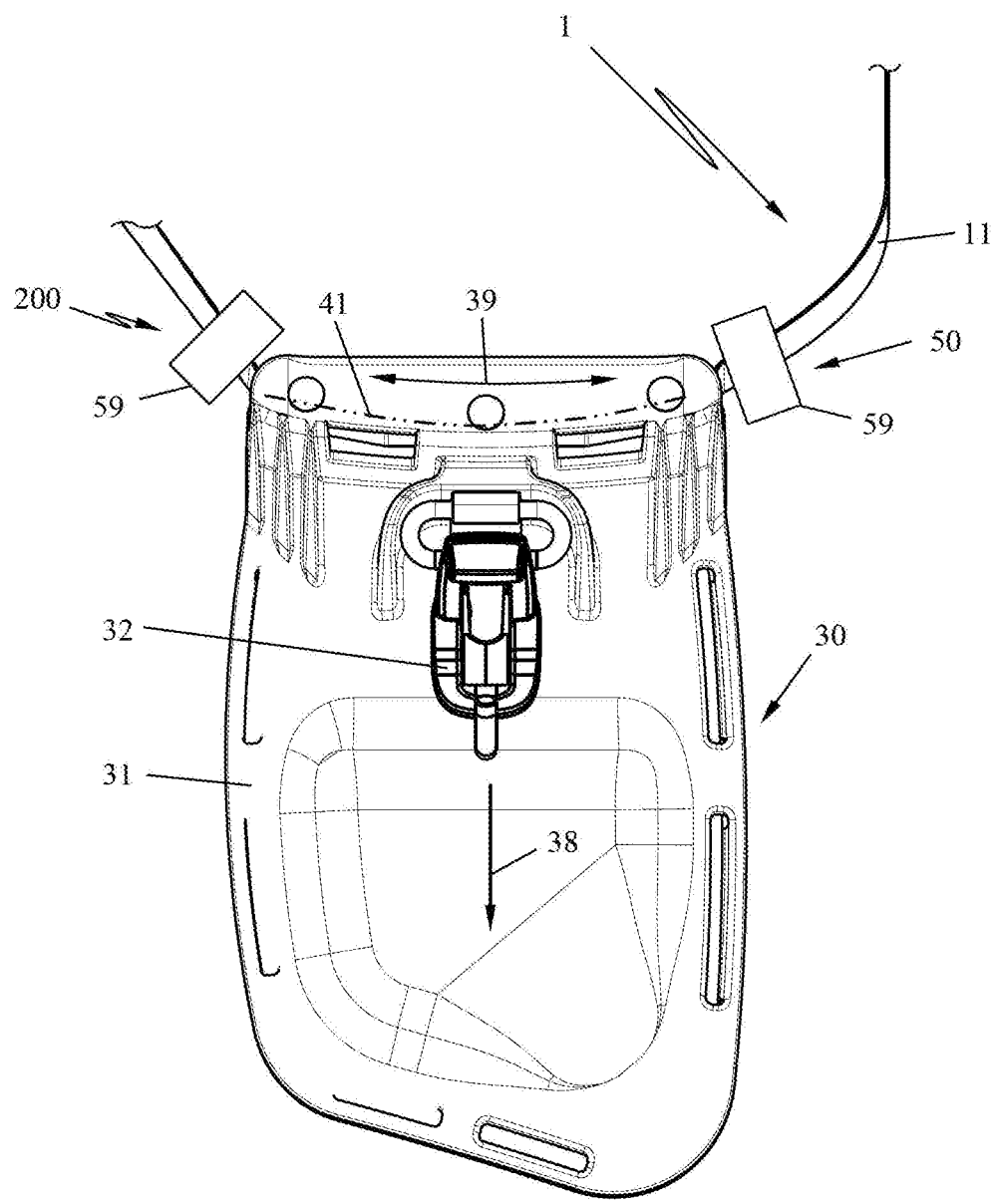
FIG. 17 is a view of the leg plate according to FIG. 13 with a closed strap channel and a fixation device for non-slidable fixation of the leg plate on the support strap.

The leg plate 30 is secured at the support strap 11 that in the embodiment according to FIG. 17 can be connected with its ends to a single shoulder strap. The shoulder strap can be placed transversely across the shoulder of a user 99. The leg plate 30, when the fixation device 50 is released, can be moved in the direction of double arrow 39 along the support strap 11.

As illustrated in FIG. 17, the fixation device 50 is secured on the support strap 11 and comprises a fixation element 59 which is to be secured immediately on the support strap 11.

In the embodiment according to FIG. 17, the fixation elements 59 are arranged outside of the strap channel 40 at the first end and the second end of the strap channel 40, respectively. In one direction of the double arrow 39, one end of the strap channel 40 will thus hit the fixation element 59 and, in the other direction of the double arrow 39, the other end of the strap channel 40 will thus hit the fixation element 59 so that the longitudinal displacement of the leg plate 30 on the support strap 11 is blocked. The fixation device 50 is in its blocking position 200.

The fixation element 59 secured on the support strap 11 can be a clamp, a brake or a similar device. Expediently, the fixation element 59 in the blocking position 200 can also engage with form fit the support strap 11, for example, can penetrate the support strap 11.

Figure 18:
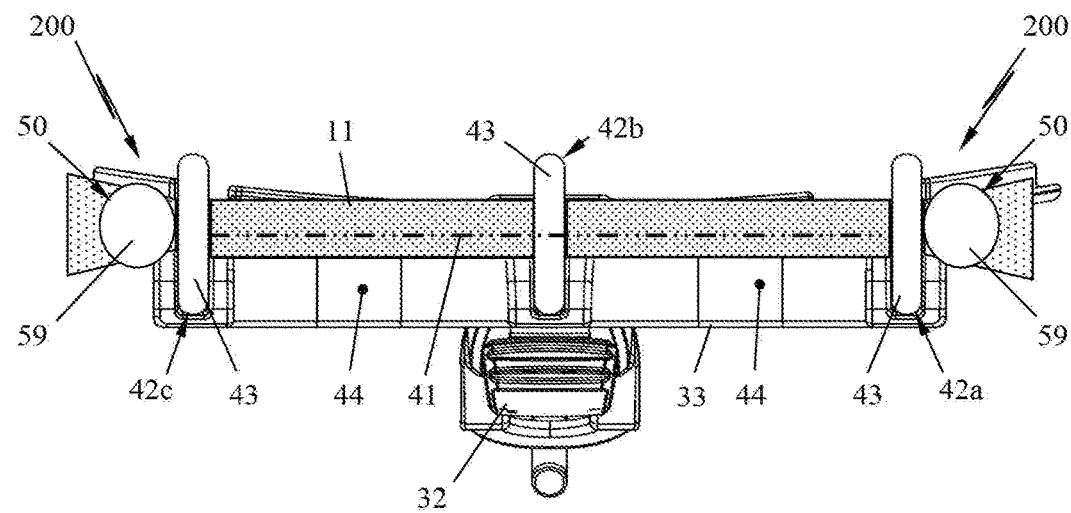
FIG. 18 is a plan view of the leg plate according to FIG. 5 with open strap channel and fixation elements secured on the support strap.
Figure 19:
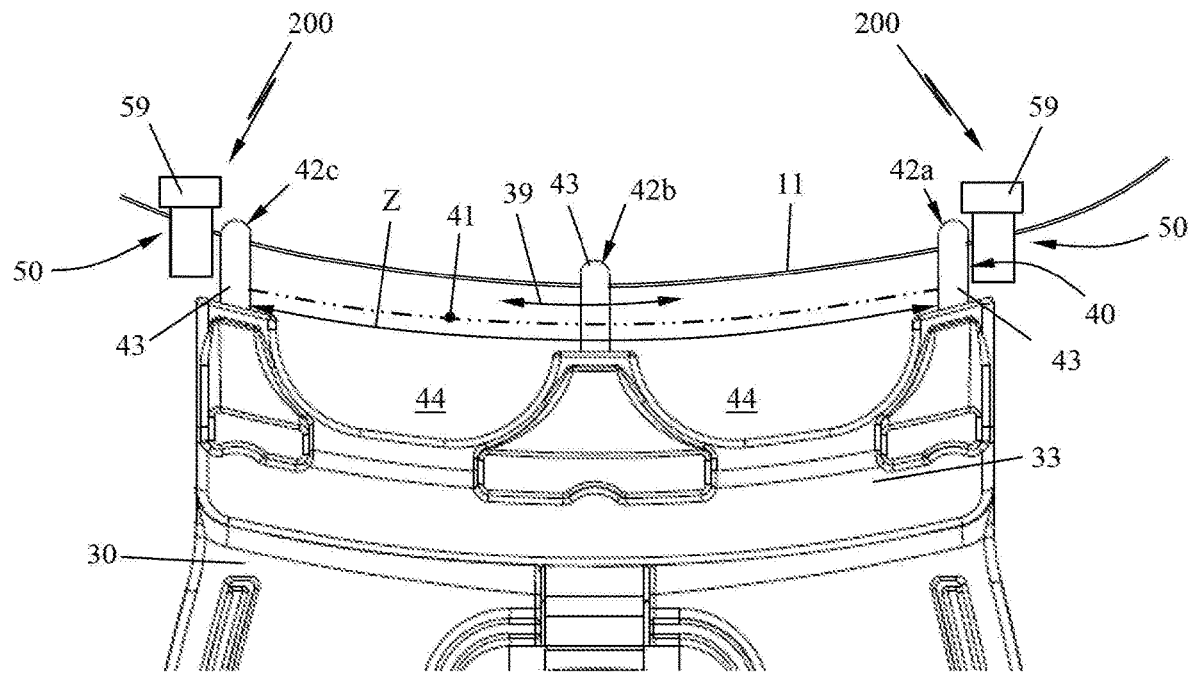
FIG. 19 is a side view of the strap channel of a leg plate with fixation elements according to FIG. 18 secured on the support strap.

A fixation device 50 corresponding to the embodiment according to FIG. 17 and provided with fixation elements 59 secured on the support strap 11 is illustrated in FIGS. 18 and 19 in a detail view. The strap channel 40 is formed by strap eyes 43. The fixation elements 59 can be spring-loaded clamps, fixation bolts or a similar device. As illustrated in FIG. 19, one fixation element 59 in the blocking position 200 of the fixation device 50 is positioned in front of a channel section 42a of the strap channel 40 and the other fixation element 59 in front of the last channel section 42c of the strap channel 40. The length Z of the strap channel 40 extends from the first channel section 42a to the last channel section 42c. The fixation elements 59 are positioned at a spacing relative to each other which corresponds to the length Z of the strap channel 40. The strap channel 40 is thus secured fixedly between the fixation elements 59 and in this sense non-slidable in the direction of double arrow 39. Minimal displacements may be permitted.

Figure 20:
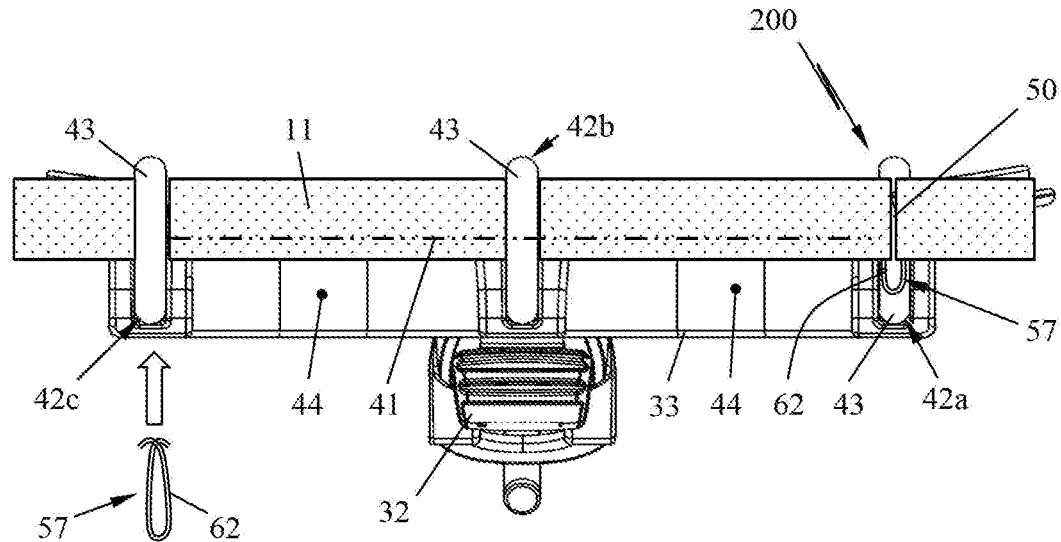
FIG. 20 is a plan view of a leg plate with a further configuration of a fixation device embodied as a clip.
Figure 21:
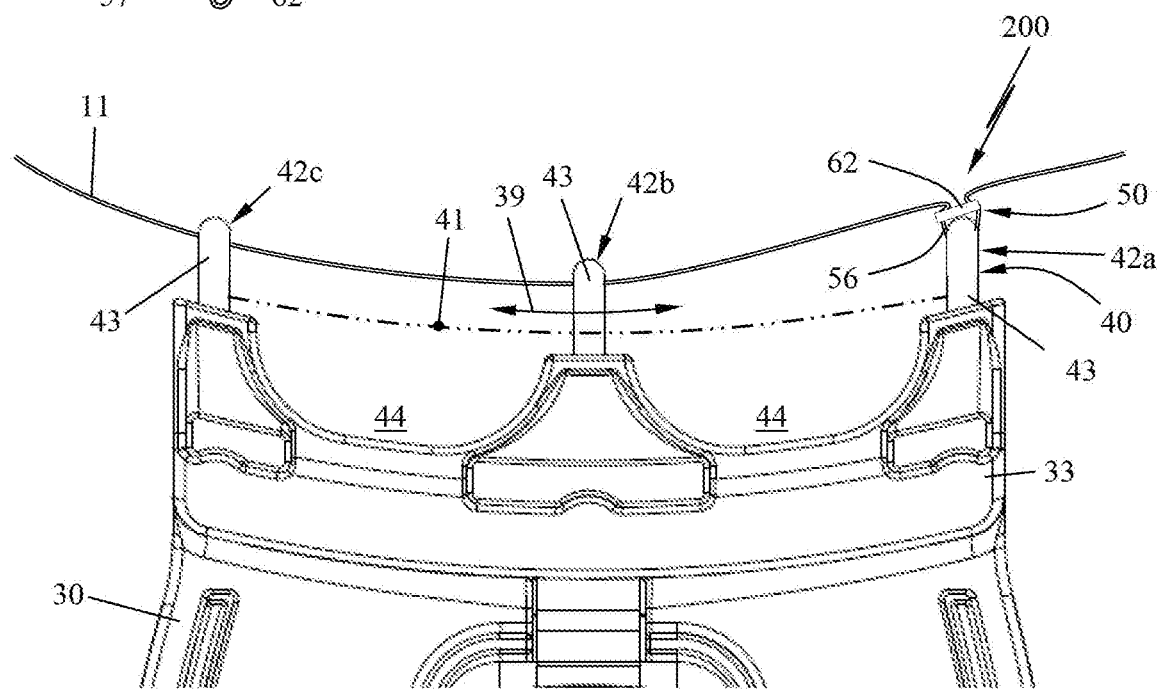
FIG. 21 is a side view of the strap channel of the leg plate with a fixation device formed by the clip.

In the embodiment of FIGS. 20 and 21, a fixation device 50 is illustrated in which the fixation element 57 is formed by a clip 62. As shown on the right side in FIG. 20, the clip 62 forming the fixation element 57 is arranged above a strap eye 43 such that the support strap 11 is lifted out of the strap channel 40. The fixation element 57 in the form of clip 62 is positioned above the strap eye 43 so that the support strap 11 assumes an enlarged wrap angle 56 about the strap eye 43. This enlarged warp angle 56 together with the sharp deflection of the support strap 11 in the region of the clip 62 prevents that the strap eye 43 which is caught within the wrap angle 56 can be moved in the direction of double arrow 39. With the exception of possibly existing minimal play, the leg plate 30 is non-slidably secured in the direction of double arrow 39 at the support strap 11.

Figure 22:
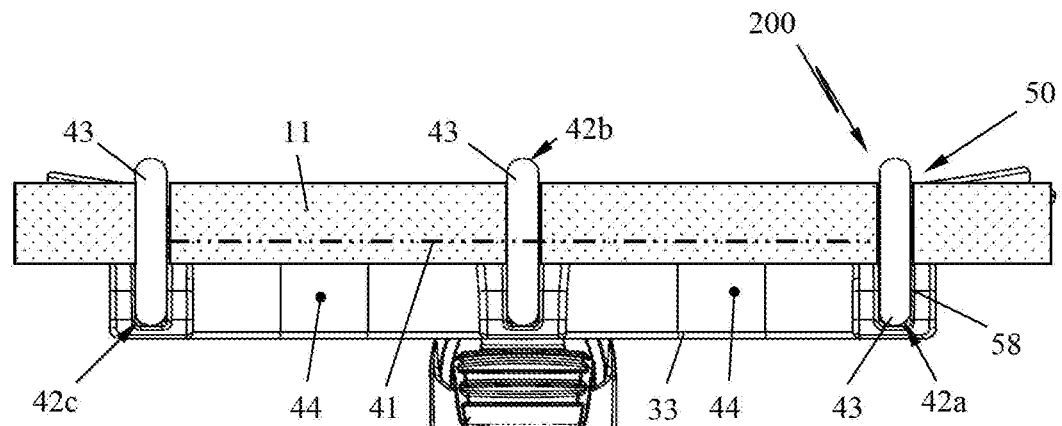
FIG. 22 is a plan view of the strap channel of a leg plate with a displaceable channel section.
Figure 23:
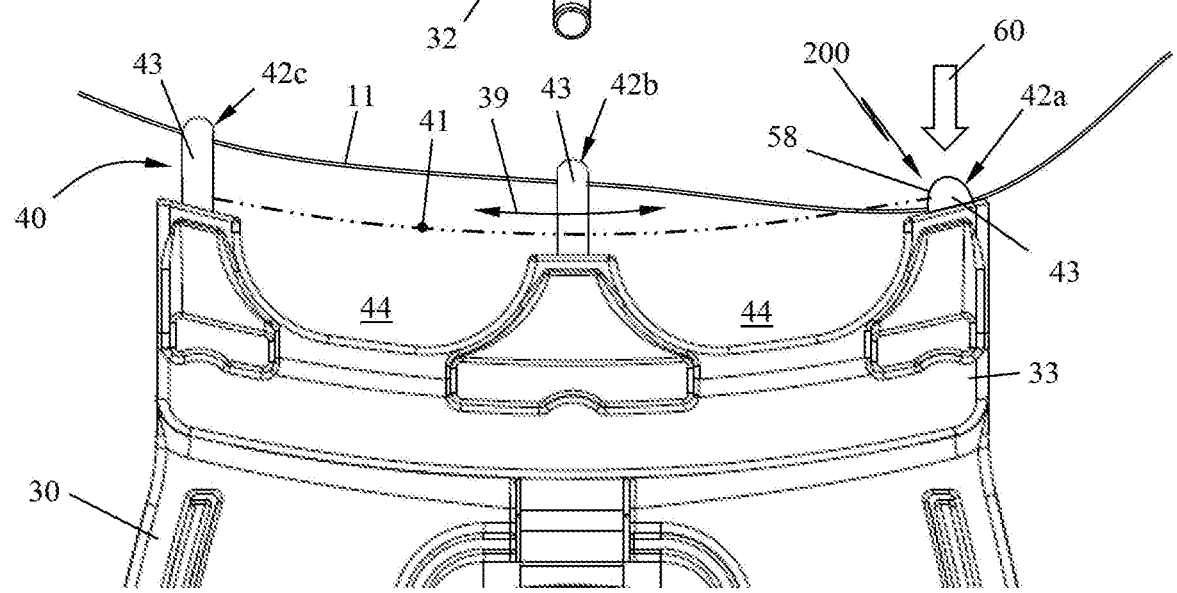
FIG. 23 is a side view of the strap channel of the leg plate according to FIG. 22.

In the embodiment according to FIGS. 22 and 23, the fixation device 50 is secured at the leg plate 30. One of the channel sections 42a, 42b, 42c of the open strap channel 40, in the embodiment the channel section 42a of the open strap channel 40, is configured as a fixation device 50. As shown in FIG. 23, the strap eye 43 of the channel section 42a forms the fixation element 58 of the fixation device 50. The strap eye 43 is moved as a movable fixation element 58 in the direction of arrow 60 into the strap channel cross section. The fixation is realized by a constriction of the strap channel. The fixation element 58 of the fixation device 50 is thus formed by the channel section 42a or the strap eye 43 which is moveable relative to the channel center axis 42. The support strap 11 is thus clamped between the strap eye 43 and the bottom of the strap channel 40. This corresponds to the blocking position 200 of the fixation device 50. In the blocking position 200 of the fixation device 50, the moving forces required for moving the leg plate 30 on the support strap 11 are significantly higher, in particular multiple times higher than the force required for displacement of the leg plate 30 in the release position 100 of the fixation device 50. In case of a strap channel 40 which is comprised of channel sections 42a, 42b, 42c, the fixation device 50 is advantageously embodied as a channel section 42a which is displaceable relative to the channel center axis 41.

Figure 24:
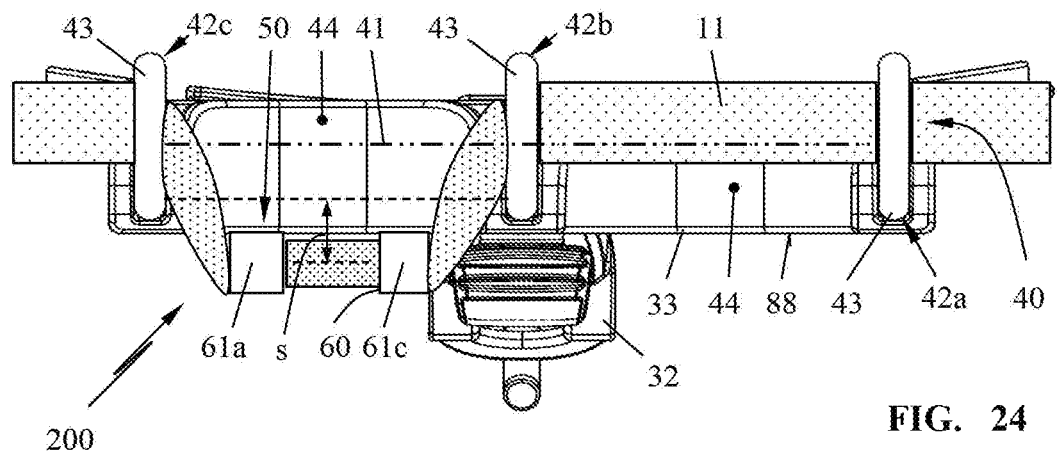
FIG. 24 is a plan view of the strap channel of the leg plate with a fixation device embodied on the leg plate.
Figure 25:
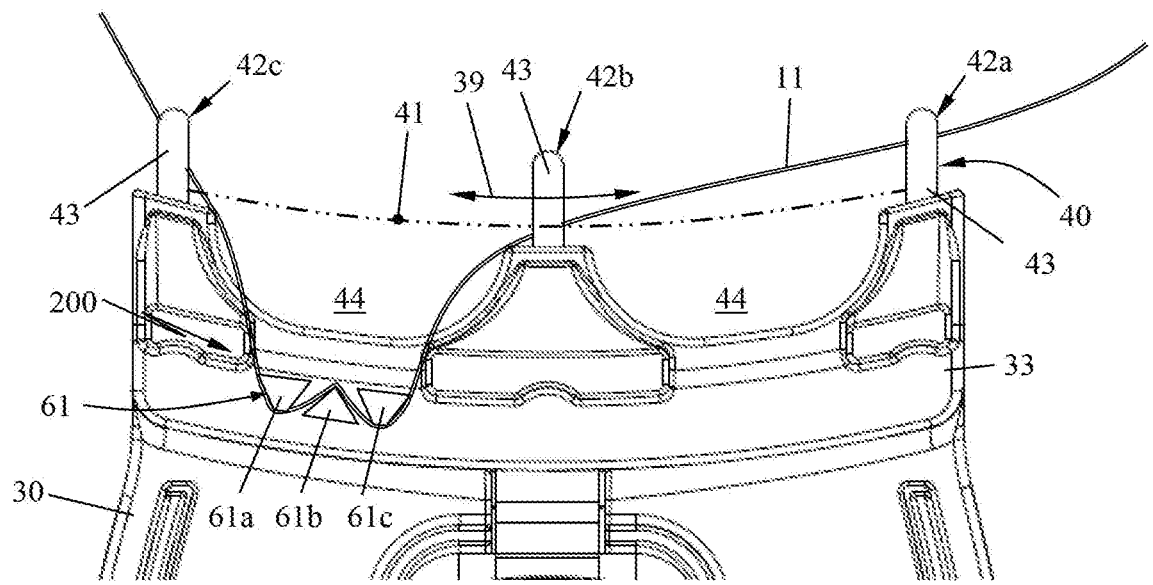
FIG. 25 is a view of the top section of the leg plate according to FIG. 24 with a strap channel formed of eyes.

In the embodiment according to FIGS. 24 and 25, the fixation device 50 is designed as a cleat 61 secured at the leg plate 30. The cleat 61 is positioned at the exterior side 88 of the support plate 31 carrying the connecting unit 32. The cleat 61 is positioned transverse to the channel center axis 41 at a lateral spacing s to the strap channel 40. As shown in FIG. 25, the cleat 61 is comprised of three clamping posts 61a, 61b, 61c between which the support strap 11 is to be threaded. The support strap 11 which is deflected from the strap channel 40 about the cleat 61, in particular by multiple deflections between the clamping posts 61a, 61b, 61c, is frictionally secured and fixes the leg plate 30 non-slidably at the support strap 11 (blocking position).

Figure 26:
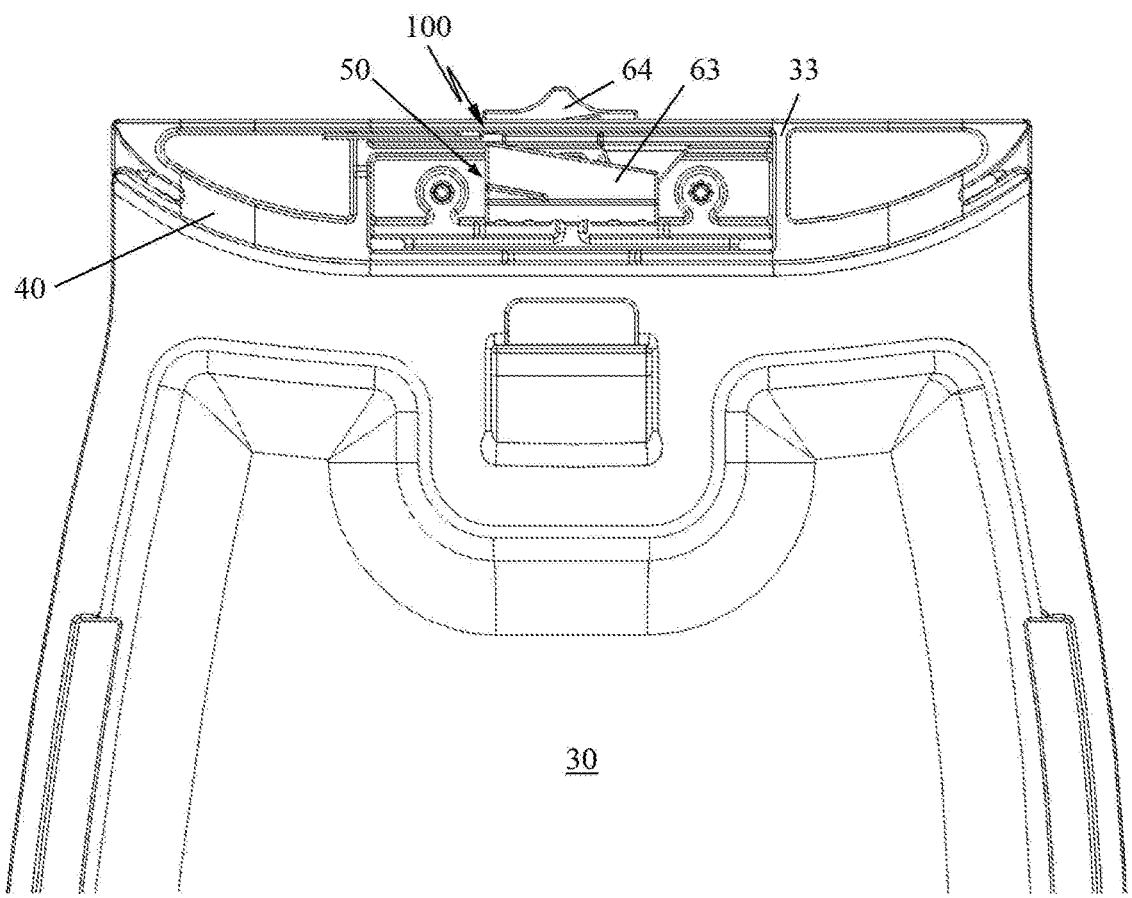
FIG. 26 is a side view of a closed strap channel of a leg plate with a fixation element arranged in the strap channel.
Figure 27:
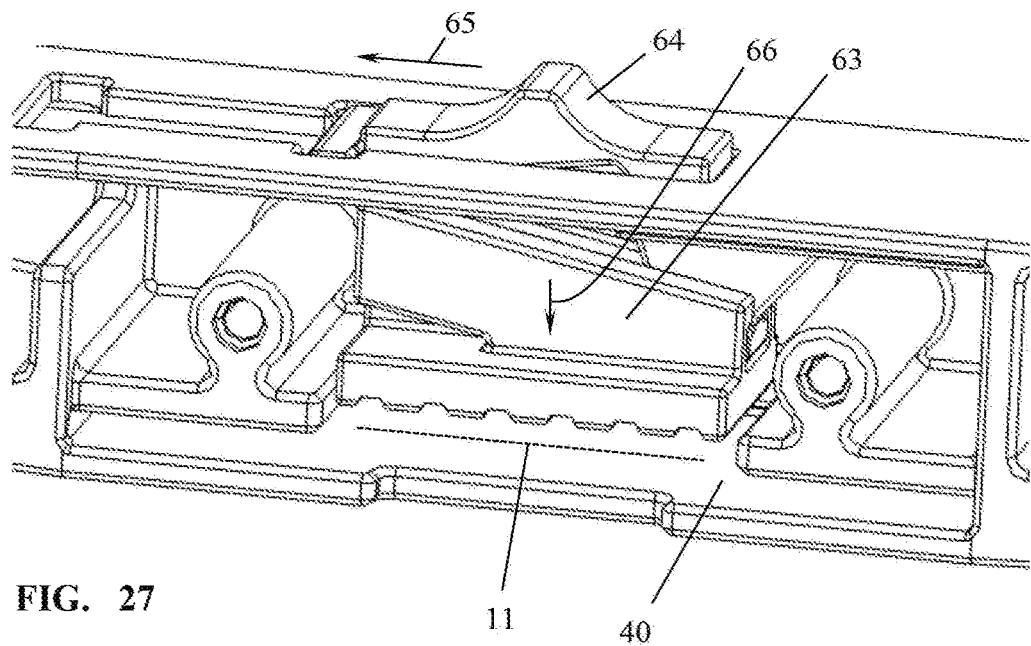
FIG. 27 shows an enlarged illustration of the fixation element according to FIG. 26 arranged in the strap channel.

In the embodiment according to FIGS. 26 and 27, the fixation element 63 of the fixation device 50 is embodied as a clamping slide (FIG. 27). In the illustrated release position 100, the leg plate 30 is slidable along the support strap 11 which is extending through the strap channel 40 that across its length is of a closed configuration.

When the slide 64 which is supported at the rim portion 33 of the leg plate 30 is displaced in the direction of arrow 65, the fixation element 63 which is embodied as a clamping block is displaced in the direction of arrow 66 into the strap channel 40, which is of a closed configuration across its length, and clamps the support strap 11 (indicated in FIG. 27 in dashed lines) extending in the strap channel 40. The fixation device 50 is in its blocking position 200.

FIG. 28 shows in a view according to FIG. 6 that the bottom end 26 of the back plate 2 can be removed from the closed textile receiving pocket 29 of the hip belt 27. First, the flap 72 has to be released which engages across an end flange 71 of the bottom end 26. Subsequently, the bottom end 26 of the back plate 2 can be pivoted in the direction of arrow 98 out of the textile receiving pocket 29. The connection of the straps of the carrying device 1 to the back plate 2 by textile receiving pockets 13, 29 is to be understood as a further development of the afore described inventions as well as its own independent invention.

This type of connection between a back plate 2 and a hip belt 27 can be applied and utilized advantageously for a carrying system for a rechargeable battery AP to be carried on the back (backpack battery). Expediently, a rechargeable battery AP can be arranged at the base plate 12 of the back plate 2. The rechargeable battery AP can be in the form of a battery pack. The rechargeable battery AP or the battery pack forms the load that is to be carried by the carrying device 1 according to the invention, wherein the load (back plate with battery pack) is supported by means of the textile receiving pocket 29, for example, at the hip belt 27. The rechargeable battery AP or battery pack serves in particular for operating an electric power tool.

In a further embodiment of the carrying device 1, at the back plate 2 or its base plate 12 a suspension means for a power tool can be provided, for example, for an electric power tool that is to be operated by the rechargeable battery AP. It can also be advantageous to carry the power tool at the hip belt 27 itself. The user can also carry and guide the power tool exclusively by means of his hands.

The attachment of a rechargeable battery AP attached to the base plate 12 of a carrying device 1 by means of a textile receiving pocket 29 at a hip belt 27 constitutes an independent invention, independent of whether a power tool is connected to the carrying device 1 and/or to the back plate 2.

Figure 29A:
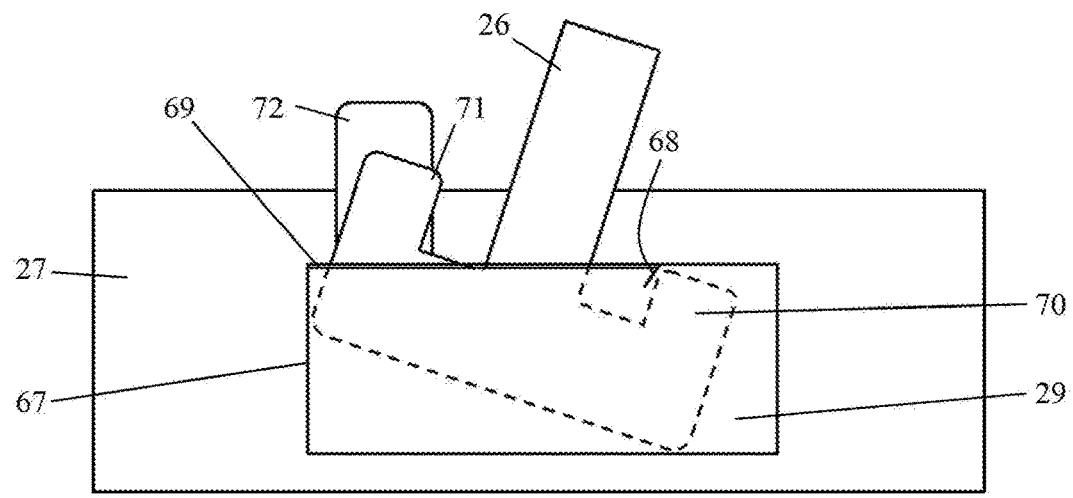
FIGS. 29A, 29B, and 29C show in schematic illustration a detachable connection formed between the lower end of the back plate and the hip belt by means of a lockable textile pocket.
Figure 29B:
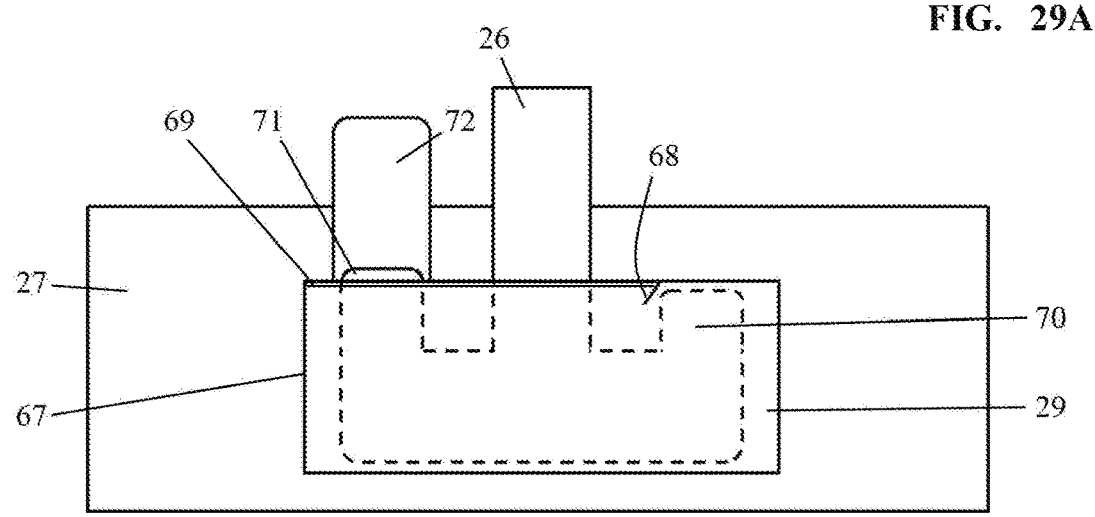
Figure 29C:
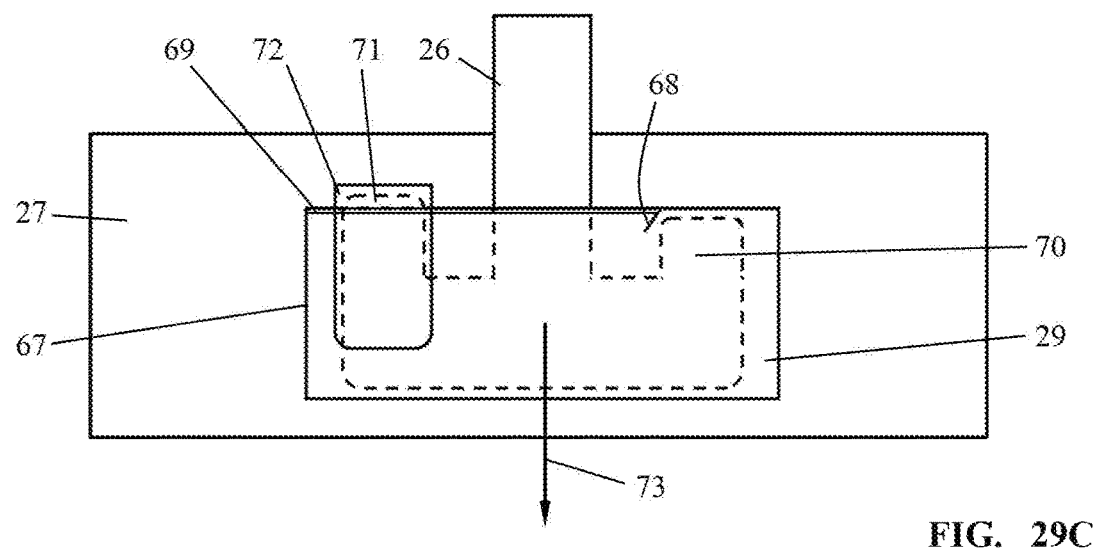

In FIGS. 29A to 29C, this additional independent invention is schematically illustrated which is embodied in an embodiment as a detachable connection between the bottom end 26 of the back plate 2 and the textile receiving pocket 29 of the hip belt 27. In general, this invention concerns the connection of shape-stable elements with textile elements of a backpack-type carrying system. In the illustrated embodiment, the back plate of a carrying device 1 is connected by means of lockable textile receiving pockets 13, 29 to straps of the carrying device 1.

In an exemplary embodiment, the textile receiving pocket 29 has an opening 69 that extends from an exterior rim 67 of the receiving pocket 29 to a dart seam 68. The bottom end 26 of the back plate 2 has a substantially T-shaped configuration with end flanges 70, 71. For connecting the bottom end 26 of the back plate 2 to the hip belt 27, the end flange 70 which has a shorter height is threaded into the receiving pocket 29 and engages behind the dart seam 68. Now, as shown in FIG. 29B, the entire T-shaped bottom end 26 of the back plate 2 is pushed into the receiving pocket 29; the taller end flange 71 projects slightly past the opening 69 of the receiving pocket 29. For fixation of the mounting position according to FIG. 29B, a flap 72 fastened to the hip belt 27 is pulled across the projecting end of the end flange 71 and fixedly connected to the exterior side of the receiving pocket 29, for example, by means of a hook and loop fastener. When closing the receiving pocket 29, the projecting end of the end flange 71 is pushed into the receiving pocket 29 and in this way the longitudinal play of the connection is minimized. Instead of the asymmetric configuration of the end flanges, it is also possible to design the receiving pocket 20 asymmetrically. The hip belt 27 is fixedly connected with the back plate 2, and the load to be transferred pushes the bottom end 26 of the back plate 2 in the direction of arrow 37 into the receiving pocket 29. A load transferring connection is ensured.

Figure 30A:
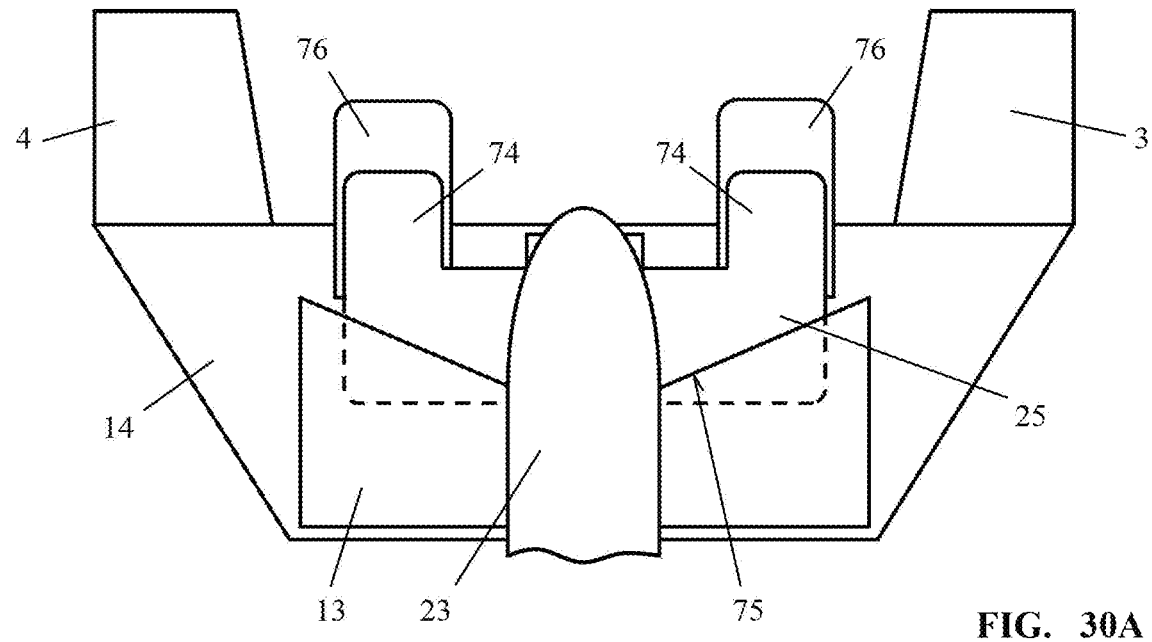
FIGS. 30A, 30B, and 30C show in schematic illustration a detachable connection of the shoulder strap unit at the top end of the back plate by means of a lockable textile pocket.
Figure 30B:
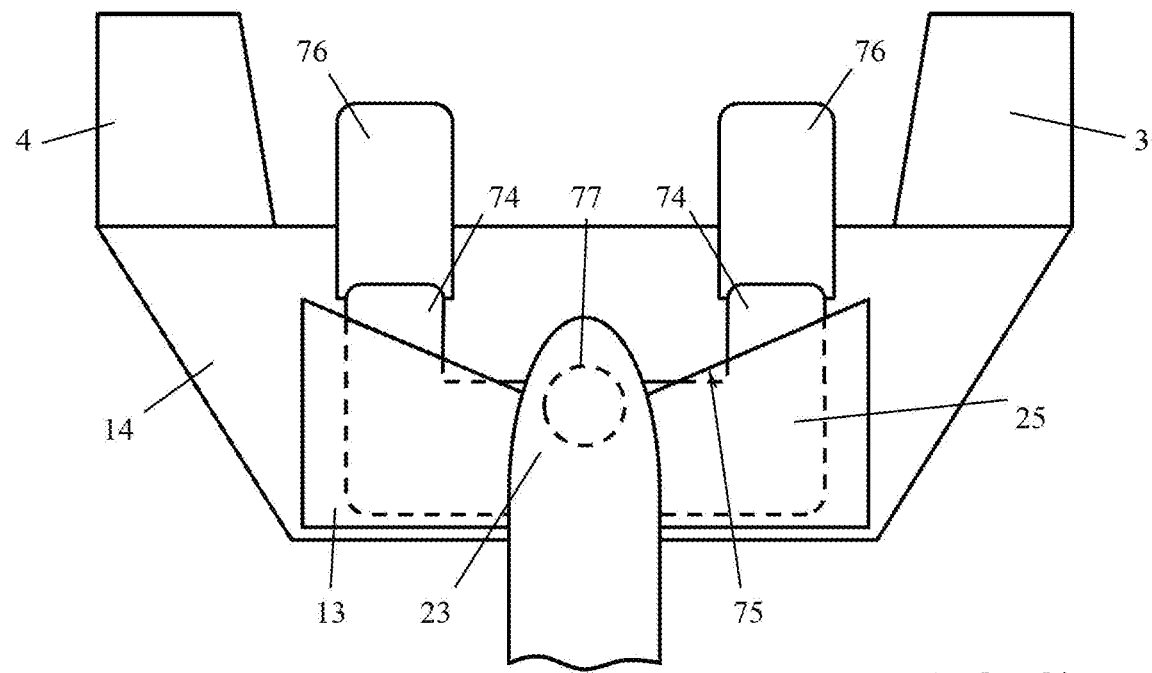
Figure 30C:
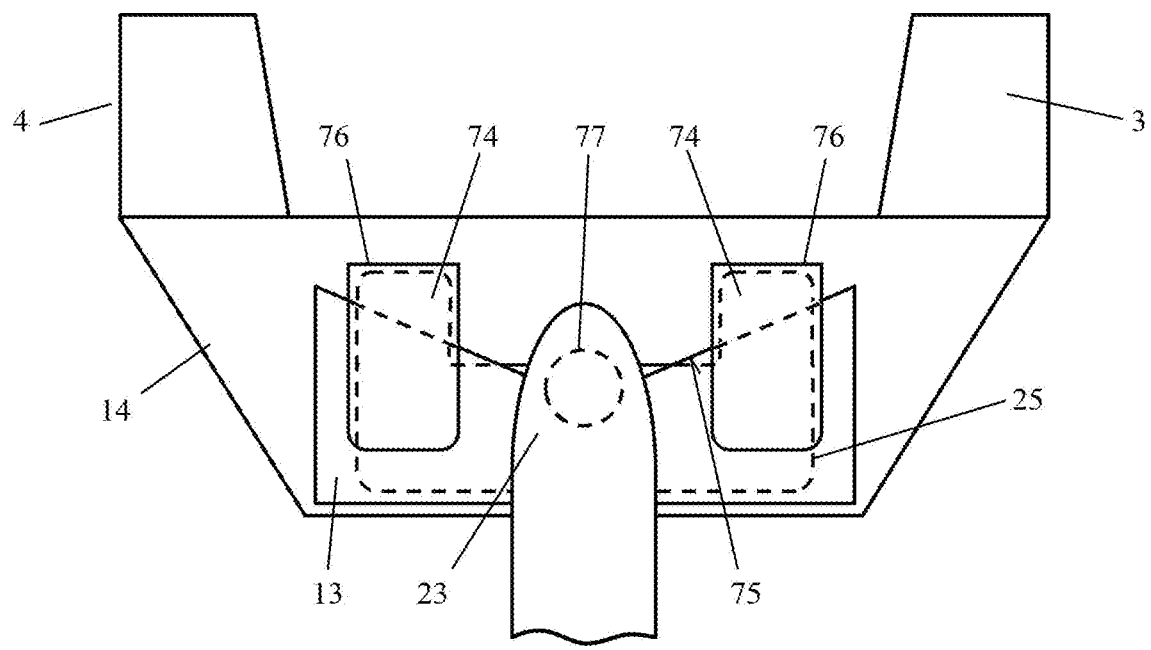

The top end 23 of the back plate 2, in the embodiment the top end 23 of the pull-out element 22, supports a mounting plate 25 which in the view according to FIG. 30A is substantially U-shaped. The receiving pocket 13 of the shoulder strap unit 14 is embodied to match the shape of the mounting plate 25; the mounting plate 25, as shown in FIG. 30B, is pushed into the receiving pocket 13 of the shoulder strap unit 14. The leg ends 74 of the U-shaped mounting plate 25 project from the opening 75 of the receiving pocket 13 and are secured by flexible flaps 76 which are fastened to the shoulder strap unit 14. The flexible flaps 76 are folded across the leg ends 74 and secured at the exterior side of the receiving pocket 13. This can be done by a hook and loop fastener or a similar particularly releasable closure, as illustrated in FIG. 30C. Expediently, the flap 76 wraps around the leg end 74 so that, by the action of folding and securing of the flap 76, the mounting plate 25 is pushed into the receiving pocket 13 and longitudinal play of this connection is minimized in this way.

For cleaning or for exchanging the textile components of the carrying device 1, the receiving pockets 13, 29 can be opened and the rigid components can be removed. In this way, the cushions can be cleaned separate from the hard components of the carrying device 1, for example, can be washed in a washing machine.

Figure 31:
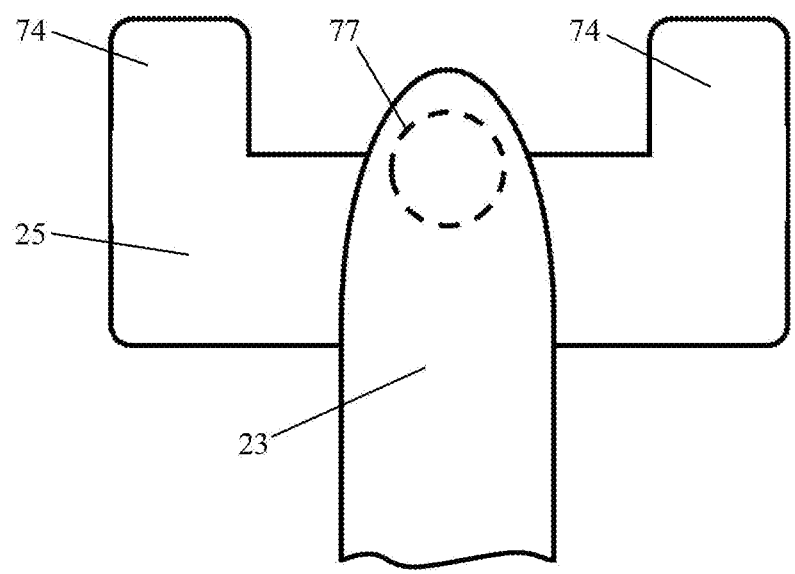
FIG. 31 is a view of the top end of the back plate with a mounting plate connected by a ball joint.
Figure 32:
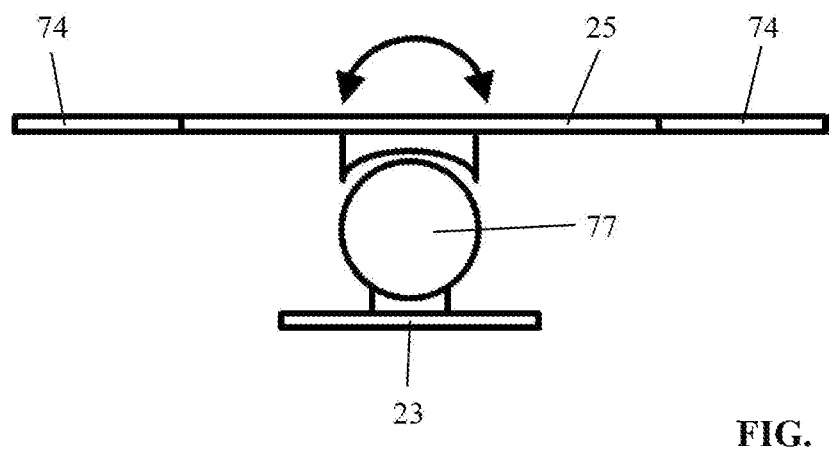
FIGS. 32 and 33 show in schematic illustration the movability of the mounting plate relative to the back plate.
Figure 33:
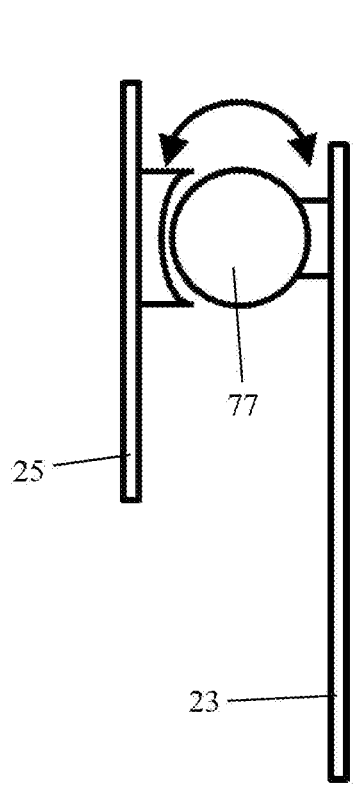

The top end 23 of the back plate 2, i.e., the top end 23 of the pull-out element 22, is illustrated in FIG. 31. The mounting plate 25 is connected by a ball joint 77. As shown in the schematic illustrations of FIGS. 32 and 33, the mounting plate 25 is pivotable in all spatial directions. The back plate 2 is thus connected pivotably with the shoulder strap unit 14. The user 99 can move without being impaired in any way by the carrying device 1.

Figure 34:
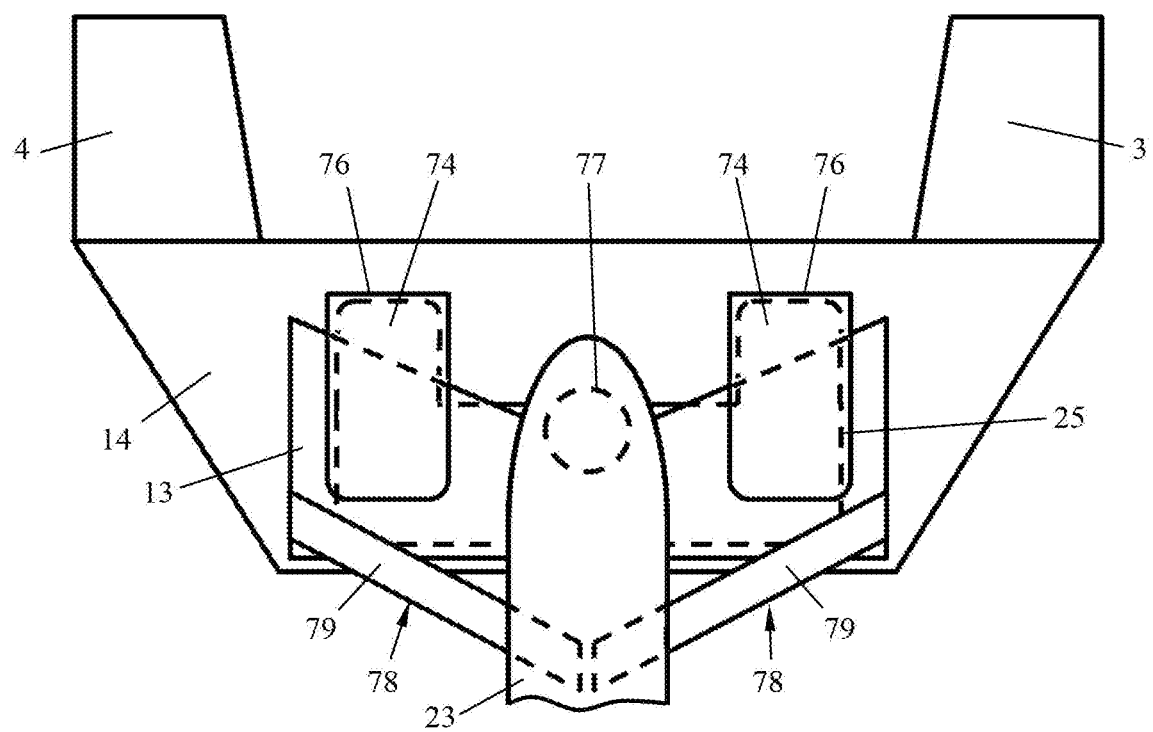
FIG. 34 is a plan view of the top end of the back plate with connected shoulder strap unit and elastic straps for positioning the shoulder strap unit relative to the back plate.

In order to hold the shoulder strap unit 14 relative to the back plate 2 in a defined initial position, spring means 78 are provided which are engaging the shoulder strap unit 14 at both sides of the ball joint 72 and are connected to the base plate 2. In the illustrated embodiment according to FIGS. 34 to 36, the spring means 78 are acting between the top end 23 of the pull-out element 22 of the back plate 2 and the shoulder strap unit 14.

Figure 36:
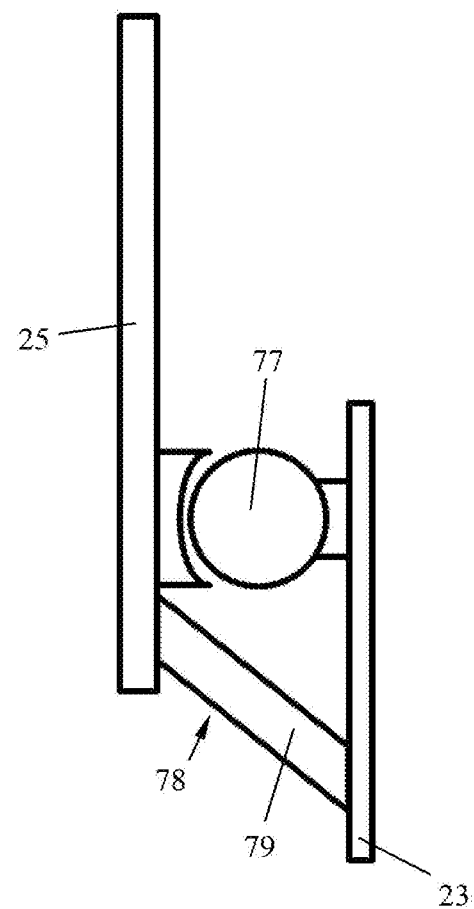
FIG. 36 is a side view of the support unit of FIG. 35 with elastic straps.
Figure 35:
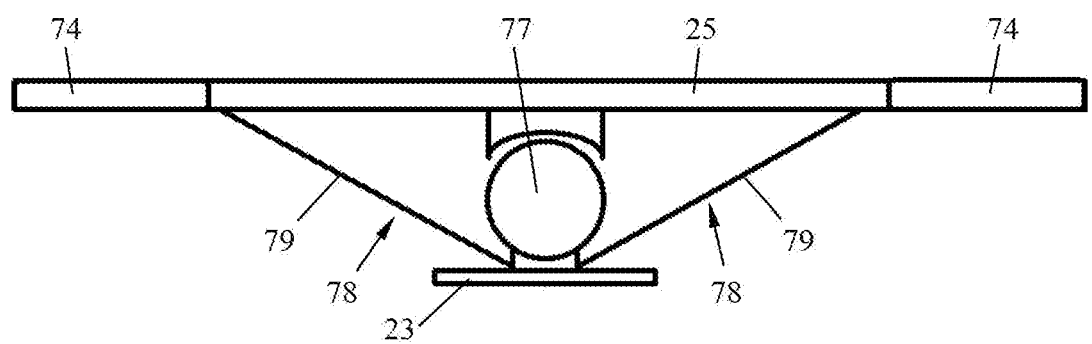
FIG. 35 is a plan view of the mounting plate for supporting the shoulder strap unit with elastic straps arranged thereat.
Figure 37:
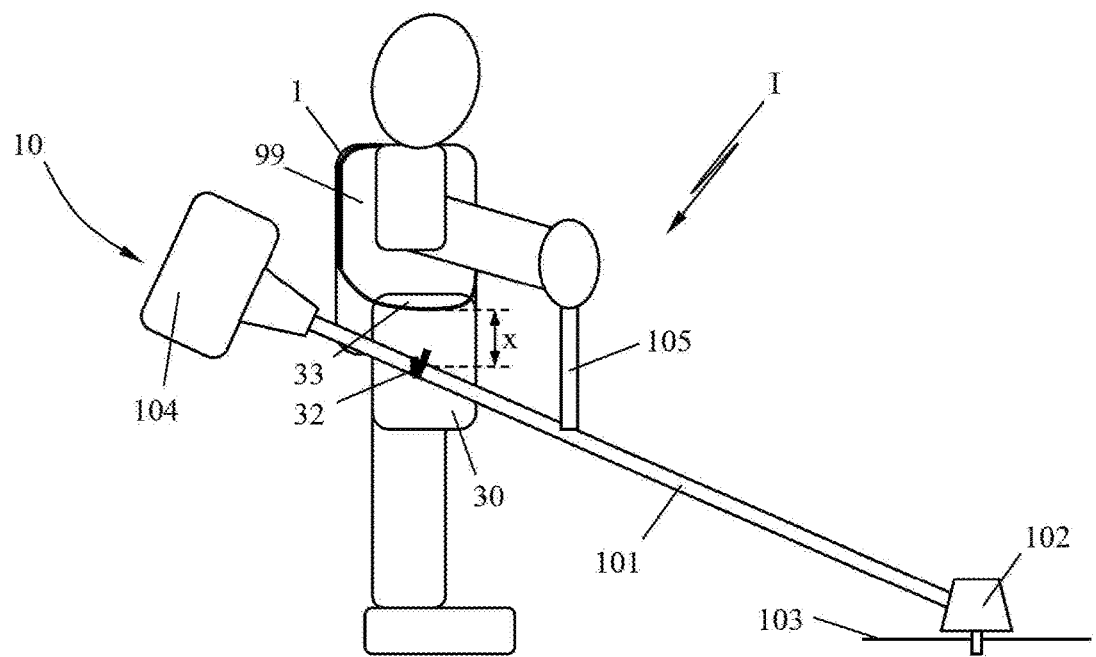
FIG. 37 is a side view of a first working mode I of a trimmer.
Figure 38:
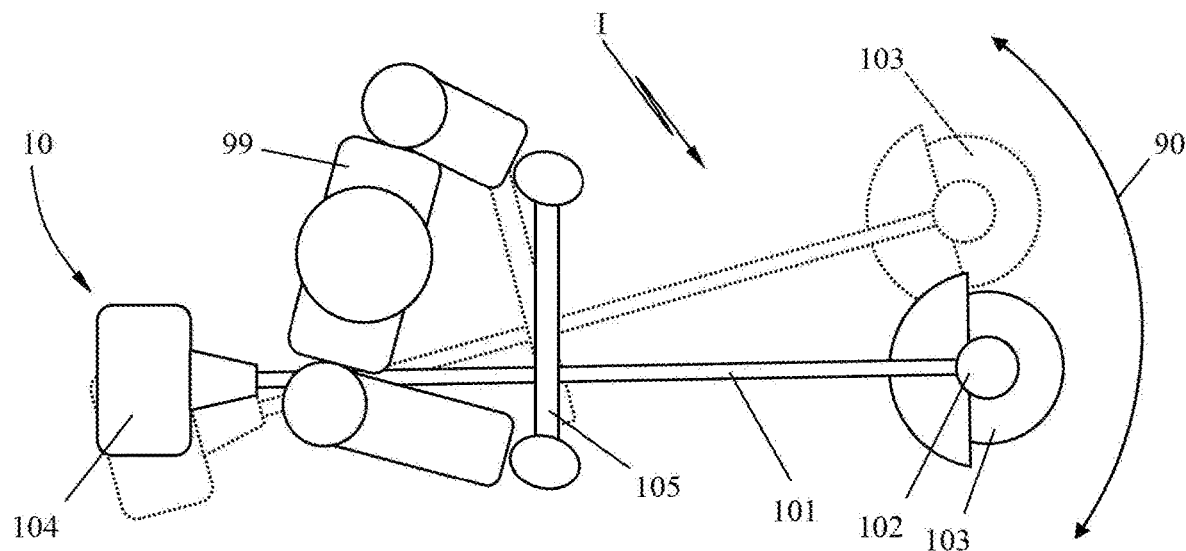
FIG. 38 is a plan view of a power tool guided by a user in the first working mode I.

The spring means 78 are preferably elastic straps 79 or the like which, as shown in FIGS. 35 and 36, extend from a point below the ball joint 77 upwardly to the shoulder strap unit 14. As shown in FIG. 35, the spring means 78 are positioned such that they are positioned symmetrically to the right and to the left of the ball joint 77 in order to ensure in the unloaded state a neutral, in particular symmetric, alignment of the shoulder strap unit 14 relative to the back plate 2.

The described fixation device 50 by means of which the leg plate 30 is to be secured to the support strap 11, is used in accordance with the working situation or the needs of the user. In FIGS. 37 to 40, a user 99 is illustrated who carries a power tool 10 in the form of a trimmer by means of the carrying device 1 according to the invention. The guide rod 101 of the power tool 10 is secured by means of the connecting unit 32 at the leg plate 30. The connecting unit 32 is positioned at a spacing x below the top rim portion 33 of the leg plate 30. The guide rod 101 carries at its bottom end a tool head 102 with a tool 103. At the other end of the guide rod 101, a drive unit 104 is arranged which can be a drive motor or a battery pack for driving an electric motor arranged in the tool head 102.

The user 99 carries the power tool 10 by means of carrying device 1. By means of a handlebar 105 illustrated in the embodiment, the power tool 10 is guided by the user. In a first working mode I, as illustrated in the plan view of FIG. 38, the tool head 102 with the tool 103 is substantially guided in a pivot movement parallel to the ground. The pivot movement is indicated by double arrow 90 in FIG. 38.

In this work situation, it may be advantageous to secure the leg plate 30 stationarily on the support strap 11. In accordance with this, the fixation device 50 is adjusted to assume the blocking position 200. The leg plate 30 is non-slidably secured on the support strap 11. Wear caused by relative movements between the leg plate 30 and the support strap 11 is also reduced thereby. The leg plate 30 maintains its lateral position initially determined by the user. An automatic operation-caused displacement of the leg plate 30 to the front side of the user's leg is prevented. It is also possible to work with a slidable leg plate if the user so desires.

Figure 39:
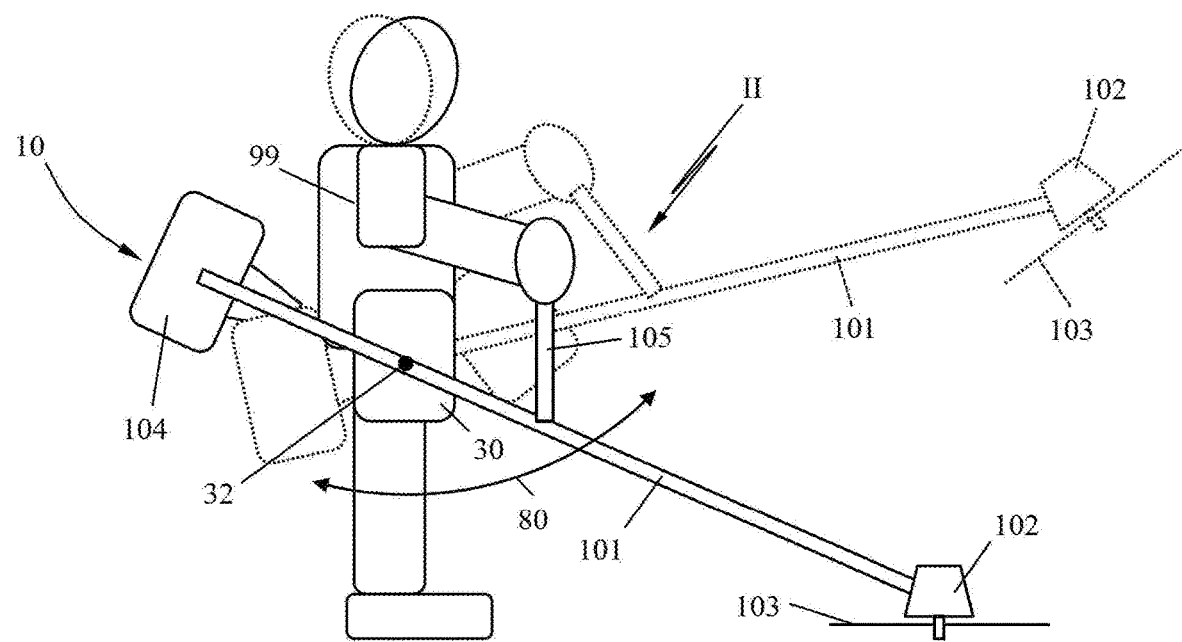
FIG. 39 is a side view of a user with the trimmer in a working mode II.
Figure 40:
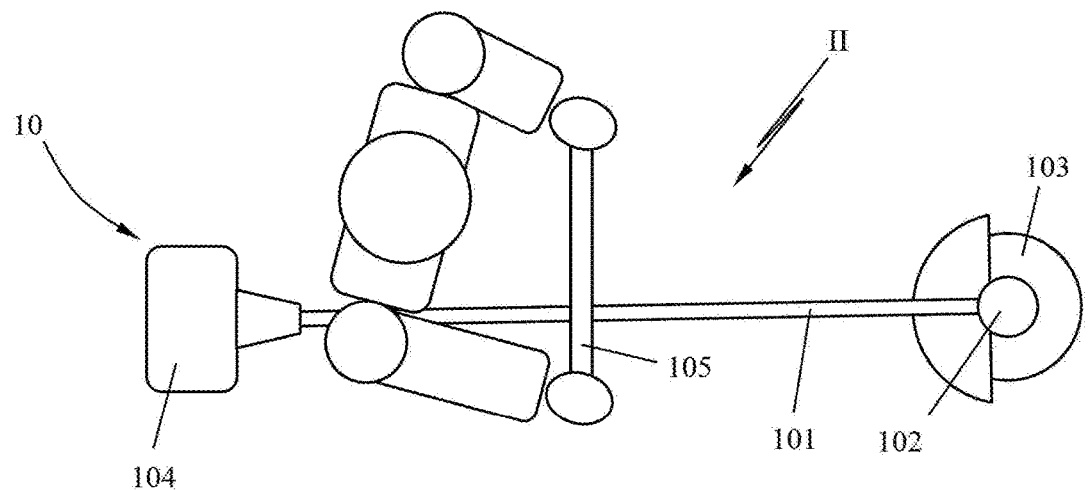
FIG. 40 is a plan view of the user with the trimmer according to FIG. 39 in the working mode II.

In another work situation, the power tool 10 is vertically pivoted as indicated by double arrow 80 in FIG. 39. In regard to this up and down movement, it may be advantageous when the leg plate 30 slides which is beneficial for expedient working. In this work situation, the fixation device 50 is moved into the release position 100 so that the leg plate 30 is movable along the support strap 11 and the vertical movement, in accordance with double arrow 80, can be performed without impairment. The leg plate 30 is slidable along the support strap 11 in accordance with movements being carried out while working.

The specification incorporates by reference the entire disclosure of German priority document 10 2017 008 754.7 having a filing date of Sep. 15, 2017.

While specific embodiments of the invention have been shown and described in detail to illustrate the inventive principles, it will be understood that the invention may be embodied otherwise without departing from such principles.

What is claimed is:

1. A carrying device for carrying a hand-guided power tool by a user, the carrying device comprising:
   at least one shoulder strap configured to support the carrying device on shoulders of a user;
   a lateral leg plate comprising a connecting unit configured to couple a power tool to the carrying device;
   a support strap operatively connected with one end to the at least one shoulder strap, wherein the leg plate is slidably arranged at the support strap and configured to slide along the support strap in a longitudinal direction of the support strap;
   a fixation device arranged between the support strap and the leg plate, wherein the fixation device comprises a release position and a blocking position;
   wherein, in the release position, the leg plate is slidable along the support strap in the longitudinal direction;
   wherein, in the blocking position, the leg plate is non-slidably secured on the support strap;
   wherein the blocking position is correlated with a first working mode of the power tool and the release position is correlated with a second working mode of the power tool.

2. The carrying device according to claim 1, wherein the leg plate comprises a strap channel, wherein the support strap is disposed in the strap channel and extends in a direction of a channel center axis through the strap channel.

3. The carrying device according to claim 2, wherein the fixation device comprises a fixation element configured to move into an open cross section of the strap channel to effect the blocking position.

4. The carrying device according to claim 1, wherein the fixation device is arranged at the leg plate.

5. The carrying device according to claim 1, wherein the fixation device comprises a fixation element arranged at the support strap.

6. The carrying device according to claim 1, wherein the leg plate comprises a strap channel, wherein the support strap is disposed in the strap channel, wherein a power tool secured at the connecting unit comprises a guide rod with a tool secured at one end of the guide rod, wherein the strap channel of the leg plate is positioned at a spacing relative to the guide rod.

7. A carrying device for carrying a hand-guided power tool by a user, the carrying device comprising:
   at least one shoulder strap configured to support the carrying device on shoulders of a user;
   a lateral leg plate comprising a connecting unit configured to couple a power tool to the carrying device;

a support strap operatively connected with one end to the at least one shoulder strap, wherein the leg plate is arranged at the support strap at a connecting location;

a coupling buckle arranged slidably at the support strap and configured to slide along the support strap in the longitudinal direction of the support strap, wherein the coupling buckle is arranged between the connecting location of the leg plate at the support strap and the at least one shoulder strap;

a lateral strap connected to the coupling buckle.

8. The carrying device according to claim 7, wherein the coupling buckle comprises at least one clamp configured to secure the coupling buckle in the longitudinal direction on the support strap.

9. The carrying device according to claim 7, wherein the coupling buckle comprises two clamps configured to secure the coupling buckle in the longitudinal direction on the support strap, wherein the two clamps each comprise an actuating part, wherein the actuating parts must be actuated together to enable the coupling buckle to slide along the support strap in the longitudinal direction.

10. The carrying device according to claim 9, wherein the actuating parts must be actuated together by two fingers of a user.

11. A carrying device for carrying a hand-guided power tool by a user, the carrying device comprising:
    at least one shoulder strap configured to support the carrying device on shoulders of a user;
    a lateral leg plate comprising a connecting unit configured to couple a power tool to the carrying device;
    a support strap operatively connected with one end to the at least one shoulder strap, wherein the leg plate is slidably arranged at the support strap and configured to slide along the support strap in a longitudinal direction of the support strap;
    wherein the leg plate comprises an exchangeable leg cushion configured to be exchanged without use of a tool.

12. The carrying device according to claim 11, wherein the leg plate comprises a support plate and guide bars arranged at the support plate, and wherein the leg cushion comprises a stiff rim, wherein the guide bars engage across the stiff rim to secure the leg cushion at the support plate.

13. A carrying device for carrying loads by a user, the carrying device comprising:
    a back plate configured to attach a load;
    at least one shoulder strap configured to support the carrying device on shoulders of a user;
    a hip belt;
    one or more at least partially lockable textile receiving pockets;
    wherein the back plate is connected to the hip belt and/or to the at least one shoulder strap by the one or more at least partially lockable textile receiving pockets, wherein the back plate is secured in the one or more at least partially lockable textile receiving pockets, wherein a section of the back plate is exchangeably secured in the one or more at least partially lockable textile receiving pockets.

14. The carrying device according to claim 13, wherein the one or more at least partially lockable textile receiving pockets include a receiving pocket formed at the hip belt, wherein the section of the back plate is exchangeably secured in the receiving pocket formed at the hip belt.

15. The carrying device according to claim 14, wherein the section of the back plate is secured by a flap in the receiving pocket formed at the hip belt.

16. The carrying device according to claim 13, wherein the one or more at least partially lockable textile receiving pockets include a receiving pocket formed at the at least one shoulder strap, wherein the section of the back plate is exchangeably secured in the receiving pocket formed at the at least one shoulder strap.

17. The carrying device according to claim 16, wherein the section of the back plate is secured by a flap in the receiving pocket formed at the at least one shoulder strap.

18. The carrying device according to claim 13, wherein the one or more at least partially lockable textile receiving pockets include a first receiving pocket formed at the hip belt, wherein the section of the back plate is exchangeably secured in the first receiving pocket, wherein the one or more at least partially lockable textile receiving pockets include a second receiving pocket formed at the at least one shoulder strap, wherein a further section of the back plate is exchangeably secured in the second receiving pocket.

19. The carrying device according to claim 18, wherein the first and second sections of the back plate are secured by a flap in the first and second receiving pockets, respectively.

* * * * *